US012573191B2

(12) United States Patent (10) Patent No.: US 12,573,191 B2

Kang et al. (45) Date of Patent: Mar. 10, 2026

(54) IMAGE PROCESSING APPARATUS AND OPERATING METHOD THEREOF

(71) Applicant: SAMSUNG ELECTRONICS CO., LTD., Suwon-si (KR)

(72) Inventors: Soomin Kang, Suwon-si (KR); Youngchan Song, Suwon-si (KR); Tammy Lee, Suwon-si (KR); Jaeyeon Park, Suwon-si (KR); Hanul Shin, Suwon-si (KR); Iljun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 18/136,614

(22) Filed: Apr. 19, 2023

(65) Prior Publication Data

US 2023/0360382 A1 Nov. 9, 2023

Related U.S. Application Data

(63) Continuation of application No. PCT/KR2023/004576, filed on Apr. 5, 2023.

(30) Foreign Application Priority Data

May 9, 2022 (KR) ........................ 10-2022-0056891
Sep. 23, 2022 (KR) ........................ 10-2022-0121078

(51) Int. Cl.
*G06V 10/82* (2022.01)
*G06F 16/532* (2019.01)
(Continued)

(52) U.S. Cl.
CPC ............ *G06V 10/82* (2022.01); *G06F 16/532* (2019.01); *G06T 5/50* (2013.01); *G06T 5/70* (2024.01);
(Continued)

(58) Field of Classification Search
CPC .. G06V 10/82; G06V 10/7715; G06V 10/774; G06V 10/454; G06F 16/532;
(Continued)

(56) References Cited

U.S. PATENT DOCUMENTS 9,142,009 B2 9/2015 Lin
10,607,319 B2 3/2020 Vogels et al.
(Continued)

FOREIGN PATENT DOCUMENTS

JP 5376906 B2 12/2013
KR 10-2020-0129198 A 11/2020
(Continued)

OTHER PUBLICATIONS

Jooeun Kim, et al., "Self-attention Siamese Networks for Similarity-based Object Tracking", Surromind Inc.pp. 535-537, 2020. 12, (Total pp. 6).
(Continued)

*Primary Examiner* — Xuemei G Chen
(74) *Attorney, Agent, or Firm* — Sughrue Mion, PLLC

(57) ABSTRACT

An image processing apparatus for processing an image by using one neural network, includes: a memory storing one instruction; and one processor configured to execute the one instruction to: obtain first feature data, based on a first image, obtain pieces of second feature data corresponding to first areas of the first image by performing first image processing on the first feature data, the first areas comprising a first number of pixels, obtain third feature data, based on the first image, obtain pieces of fourth feature data corresponding to second areas of the first image, by performing second image processing on the third feature data, the second areas comprising a second number of pixels that is
(Continued)

greater than the first number, and generate a second image, based on the pieces of second feature data and the pieces of fourth feature data.

18 Claims, 15 Drawing Sheets

(51) Int. Cl.

| | | |
|---|---|---|
| *G06T 5/50* | (2006.01) | |
| *G06T 5/70* | (2024.01) | |
| *G06V 10/77* | (2022.01) | |
| *G06V 10/774* | (2022.01) | |

(52) U.S. Cl.
CPC ........ *G06V 10/7715* (2022.01); *G06V 10/774* (2022.01); *G06T 2207/20021* (2013.01); *G06T 2207/20081* (2013.01); *G06T 2207/20084* (2013.01); *G06T 2207/20192* (2013.01)

(58) Field of Classification Search
CPC ... G06F 16/55; G06T 5/50; G06T 5/70; G06T 2207/20021; G06T 2207/20081; G06T 2207/20084; G06T 2207/20192; G06T 5/60; G06N 3/045; G06N 3/0464
See application file for complete search history.

(56) References Cited

U.S. PATENT DOCUMENTS

| | | | | |
|---|---|---|---|---|
| 10,706,555 | B2 | 7/2020 | Lin | |
| 11,032,550 | B2 | 6/2021 | Ye et al. | |
| 11,051,010 | B2 | 6/2021 | Chiang et al. | |
| 12,346,794 | B2 * | 7/2025 | Liu | G06N 3/042 |
| 2011/0243434 | A1 | 10/2011 | Cao | |
| 2018/0341860 | A1 | 11/2018 | Shazeer et al. | |
| 2020/0204824 | A1 | 6/2020 | Lai et al. | |
| 2021/0110258 | A1 * | 4/2021 | Lee | G10L 15/063 |
| 2021/0133920 | A1 | 5/2021 | Lee et al. | |
| 2021/0174138 | A1 * | 6/2021 | Choi | G06V 10/26 |
| 2021/0209356 | A1 * | 7/2021 | Wang | G06V 30/416 |
| 2021/0326650 | A1 * | 10/2021 | Jang | G06N 3/045 |
| 2021/0390410 | A1 * | 12/2021 | Vaswani | G06N 3/08 |
| 2022/0014807 | A1 * | 1/2022 | Lin | G06N 3/044 |
| 2022/0108478 | A1 * | 4/2022 | Houlsby | G06T 7/97 |
| 2022/0245424 | A1 * | 8/2022 | Goyal | G06V 10/82 |
| 2022/0301550 | A1 * | 9/2022 | Wei | G10L 25/30 |
| 2022/0360824 | A1 | 11/2022 | Chiang et al. | |
| 2023/0017072 | A1 * | 1/2023 | Arnab | G06V 10/82 |
| 2023/0100413 | A1 * | 3/2023 | Zhu | G06T 7/11 |
| | | | | 375/240.18 |
| 2023/0169626 | A1 * | 6/2023 | Sidiya | G06F 18/213 |
| | | | | 382/157 |
| 2023/0222623 | A1 * | 7/2023 | Ke | G06T 3/04 |
| | | | | 382/155 |
| 2023/0306600 | A1 * | 9/2023 | Zhang | G06T 7/11 |
| 2023/0334829 | A1 * | 10/2023 | Du | G06V 10/776 |
| 2024/0054760 | A1 * | 2/2024 | Xiang | G06V 10/7753 |
| 2024/0249115 | A1 * | 7/2024 | Sun | G06N 3/0464 |
| 2024/0265586 | A1 * | 8/2024 | Zhao | G06N 3/045 |
| 2024/0289960 | A1 * | 8/2024 | Zhong | G06N 3/00 |
| 2024/0386274 | A1 * | 11/2024 | Zhou | G06N 3/08 |

| | | | | |
|---|---|---|---|---|
| 2025/0069397 | A1 * | 2/2025 | Luo | G06V 20/46 |
| 2025/0078927 | A1 * | 3/2025 | Yu | G11C 16/0483 |
| 2025/0252537 | A1 * | 8/2025 | Assael | G06N 3/0464 |

FOREIGN PATENT DOCUMENTS

| | | | |
|---|---|---|---|
| KR | 10-2021-0051242 | A | 5/2021 |
| KR | 10-2278756 | B1 | 7/2021 |
| KR | 10-2022-0055549 | A | 5/2022 |
| KR | 10-2022-0061247 | A | 5/2022 |

OTHER PUBLICATIONS

Prajit Ramachandran, et al. , "Stand-Alone Self-Attention in Vision Models", arXiv:1906.05909v1 [cs.CV], pp. 1-15, Jun. 2019, (Total pp. 16).

Mohamed H. Abdelpakey, et al. , "DensSiam: End-to-End Densely-Siamese Network with Self-Attention Model for Object Tracking", arXiv:1809.02714v1 [cs.CV], pp. 1-11, Sep. 2018, (Total pp. 12).

International Search Report and Written Opinion (PCT/ISA/210 & 237) dated Jul. 17, 2023 issued by the International Searching Authority in counterpart International Application No. PCT/KR2023/004576.

Zhang et al., "Efficient Long-Range Attention Network for Image Super-resolution", Lecture Notes in Computer Science, Mar. 13, 2022, 20 total pages, DOI: 10.1007/978-3-031-19790-1_39, XP093254685.

Liu et al., "Face Super-Resolution Reconstruction Based on Self-Attention Residual Network", IEEE Access, Aug. 1, 2020, pp. 4110-4121, vol. 8, DOI: 10.1109/ACCESS.2019.2962790, XP093254674, ISSN: 2169-3536.

Communication dated Mar. 12, 2025, issued by European Patent Office in European Patent Application No. 23803700.6.

Hanting Chen et al., "Pre-Trained Image Processing Transformer", Computer Vision and Pattern Recognition (CVPR), 2021, pp. 12299-12310.

Jingyun Liang et al., "SwinIR: Image Restoration Using Swin Transformer", International Conference on Computer Vision Workshops (ICCVW), 2021, pp. 1833-1844.

Kostadin Dabov et al., "Image Denoising by Sparse 3-D Transform-Domain Collaborative Filtering", IEEE Transactions on Image Processing, Aug. 2007, vol. 16, Issue No. 8, pp. 2080-2095.

Kai Zhang et al., "Beyond a Gaussian Denoiser: Residual Learning of Deep CNN for Image Denoising", IEEE Transactions on Image Processing, Jul. 2017, vol. 26, Issue No. 7, pp. 3142-3155.

Alessandro Foi et al., "Pointwise Shape-Adaptive DCT for High-Quality Denoising and Deblocking of Grayscale and Color Images", IEEE Transactions on Image Processing, May 2007, vol. 16, Issue No. 5, pp. 1395-1411.

Christian Ledig et al., "Photo-Realistic Single Image Super-Resolution Using a Generative Adversarial Network", Computer Vision and Pattern Recognition (CVPR), 2017, pp. 4681-4690.

Soo Min Kang et al., "iiTransformer: A Unified Approach to Exploiting Local and Non-Local Information for Image Restoration", British Machine Vision Conference (BMVC), Nov. 21, 2022, pp. 1-14.

Ze Liu et al., "Swin Transformer: Hierarchical Vision Transformer using Shifted Windows", International Conference on Computer Vision (ICCV), 2021, pp. 10012-10022.

Communication dated Aug. 19, 2025, issued by European Patent Office in European Patent Application No. 23803700.6.

* cited by examiner

FIG. 3

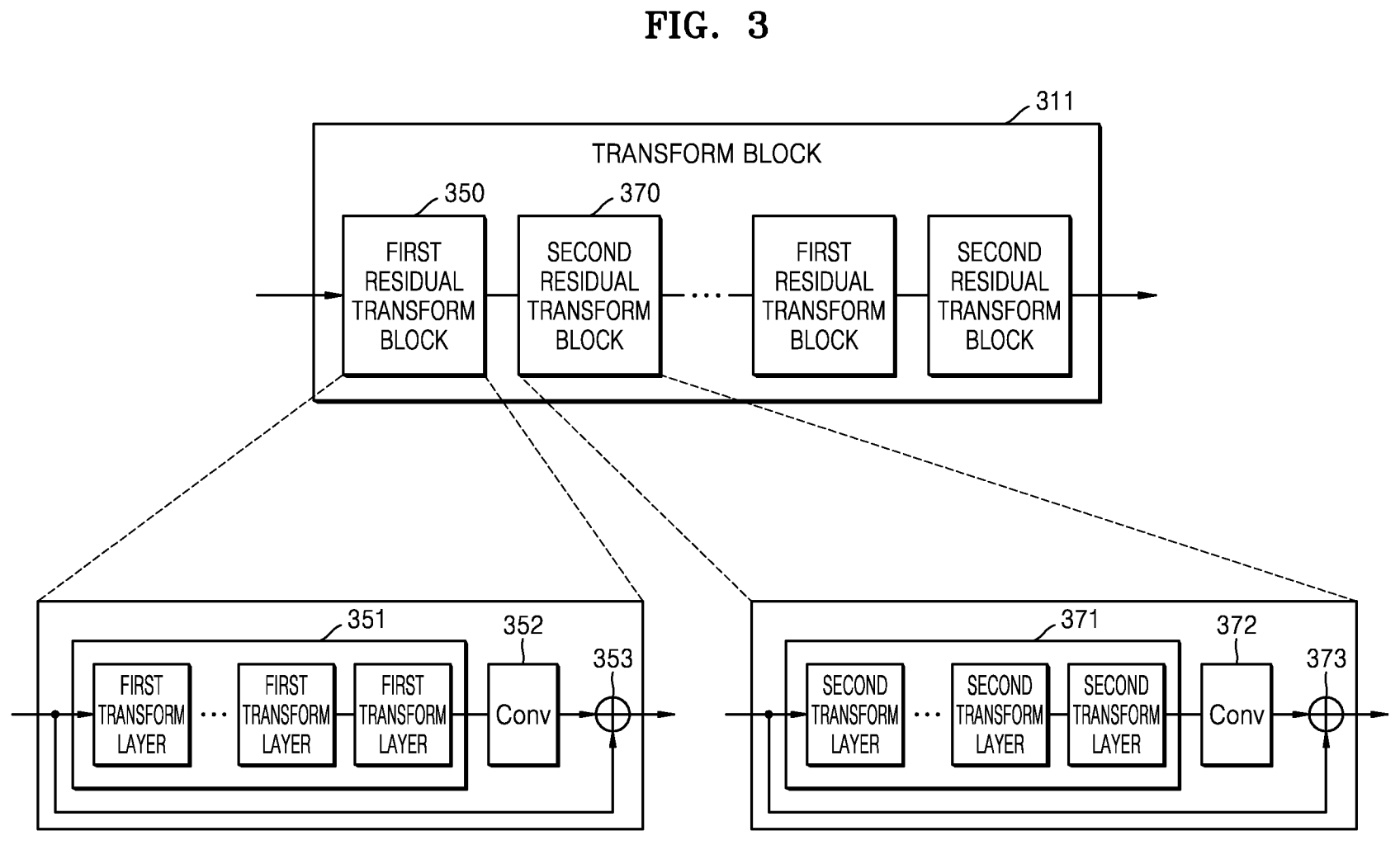

TRANSFORM BLOCK 311

FIRST RESIDUAL TRANSFORM BLOCK 350

SECOND RESIDUAL TRANSFORM BLOCK 370

FIRST RESIDUAL TRANSFORM BLOCK

...

SECOND RESIDUAL TRANSFORM BLOCK

FIRST TRANSFORM LAYER

FIRST TRANSFORM LAYER

...

FIRST TRANSFORM LAYER 351

Conv 352

353

SECOND TRANSFORM LAYER

SECOND TRANSFORM LAYER

...

SECOND TRANSFORM LAYER 371

Conv 372

IMAGE PROCESSING APPARATUS AND OPERATING METHOD THEREOF

CROSS-REFERENCE TO RELATED APPLICATIONS

This application is a by-pass continuation application of International Application No. PCT/KR2023/004576, filed on Apr. 5, 2023, which is based on and claims priority to Korean Patent Application Nos. 10-2022-0056891, filed on May 9, 2022, and 10-2022-0121078, filed on Sep. 23, 2022, in the Korean Intellectual Property Office, the disclosures of which are incorporated by reference herein their entireties.

BACKGROUND

1. Field

The disclosure relates to an image processing apparatus for processing an image by using a neural network, and a method of the image processing apparatus.

2. Description of Related Art

As data traffic increases exponentially with the development of computer technology, artificial intelligence has become an important trend for leading future innovation. Artificial intelligence is a method that mimics human thinking, and is thus limitlessly applicable to virtually all industries. Representative technologies of artificial intelligence include pattern recognition, machine learning, expert systems, neural networks, and natural language processing.

A neural network may model the characteristics of human biological nerve cells by using mathematical expressions, and use an algorithm that mimics a human's learning ability. Through this algorithm, the neural network is able to generate a mapping between input data and output data, and the ability to generate such mapping may be expressed as a learning ability of the neural network. In summation, the neural network has a generalization ability to generate output data with respect to input data that has not been used for learning, based on a learning result.

A neural network may be used for image processing. In particular, image processing for removing noise or artifacts of an image or increasing a resolution of an image may be performed by using a deep neural network (DNN).

SUMMARY

Provided is an image processing apparatus that may process an image, by using one or more neural networks.

According to an image processing apparatus for processing an image by using at least one neural network, the image processing apparatus may include a memory storing at least one instruction; and at least one processor configured to execute the at least one instruction.

The at least one processor may be further configured to execute the at least one instruction to obtain first feature data, based on a first image.

The at least one processor may be further configured to execute the at least one instruction to obtain pieces of second feature data corresponding to first areas of the first image, by performing first image processing on the first feature data, the first areas including a first number of pixels.

The at least one processor may be further configured to execute the at least one instruction to obtain third feature data, based on the first image.

The at least one processor may be further configured to execute the at least one instruction to obtain pieces of fourth feature data corresponding to second areas of the first image, by performing second image processing on the third feature data, the second areas including a second number of pixels that is greater than the first number.

The at least one processor may be further configured to execute the at least one instruction to generate a second image, based on the pieces of second feature data and the pieces of fourth feature data.

Each of the first image processing and the second image processing may include performing a self-attention operation.

The at least one processor may be further configured to execute the at least one instruction to: obtain the pieces of second feature data respectively corresponding to the first areas, based on information about peripheral areas of each of the first areas, and obtain the pieces of fourth feature data respectively corresponding to the second areas, based on information about peripheral areas of each of the second areas.

The first number is 1, and each of the first areas may include one pixel.

The at least one processor may be further configured to execute the at least one instruction to: obtain pieces of query data, pieces of key data, and pieces of value data included in the first feature data, the pieces of query data, the pieces of key data, and the pieces of value data respectively corresponding to the first areas, obtain a weight matrix, based on the pieces of query data and the pieces of key data, and obtain the pieces of second feature data, based on the pieces of value data and the weight matrix.

The at least one processor may be further configured to execute the at least one instruction to: obtain a correlation matrix, based on the pieces of query data and the pieces of key data, and obtain the weight matrix by applying, to the correlation matrix, a position bias based on a size of the first image and sizes of images used to train the at least one neural network.

The at least one processor may be further configured to execute the at least one instruction to: transform the third feature data divided into third areas including the first number of pixels to be divided into the second areas, and obtain the pieces of fourth feature data by performing the second image processing on each of the second areas.

The at least one processor may be further configured to execute the at least one instruction to: obtain pieces of first query data, pieces of first key data, and pieces of first value data included in the third feature data, the pieces of first query data, the pieces of first key data, and the pieces of first value data respectively corresponding to third areas including the first number of pixels, obtain pieces of second query data, pieces of second key data, and pieces of second value data corresponding to the second areas, by grouping the pieces of first query data, the pieces of first key data, and the pieces of first value data to respectively correspond to the second areas, obtain a weight matrix, based on the pieces of second query data and the pieces of second key data, and obtain the pieces of fourth feature data, based on the pieces of second value data and the weight matrix.

The third feature data is obtained from the pieces of second feature data.

The at least one neural network may include at least one convolutional neural network, and the at least one processor may be further configured to execute the at least one instruction to extract the first feature data from the first image by using the at least one convolutional neural network.

The at least one neural network may include at least one convolutional neural network, and the at least one processor may be further configured to execute the at least one instruction to: obtain fifth feature data, based on the pieces of second feature data and the pieces of fourth feature data, and obtain the second image from the fifth feature data, by using the at least one convolutional neural network.

According to an aspect of the disclosure, an operating method of an image processing apparatus for processing an image by using at least one neural network, may include obtaining first feature data, based on a first image.

The operating method of an image processing apparatus for processing an image by using at least one neural network, may include obtaining pieces of second feature data corresponding to first areas of the first image, by performing first image processing on the first feature data, the first areas including a first number of pixels.

The operating method of an image processing apparatus for processing an image by using at least one neural network, may include obtaining third feature data, based on the first image.

The operating method of an image processing apparatus for processing an image by using at least one neural network, may include obtaining pieces of fourth feature data corresponding to second areas of the first image, by performing the second image processing on the third feature data, the second areas including a second number of pixels that is greater than the first number.

The operating method of an image processing apparatus for processing an image by using at least one neural network, may include generating a second image, based on the pieces of second feature data and the pieces of fourth feature data.

Each of the first image processing and the second image processing may include performing a self-attention operation.

The obtaining the pieces of second feature data may include obtaining the pieces of second feature data respectively corresponding to the first areas, based on information about peripheral areas of each of the first areas, and the obtaining the pieces of fourth feature data may include obtaining the pieces of fourth feature data respectively corresponding to the second areas, based on information about peripheral areas of each of the second areas.

The first number is 1, and each of the first areas may include one pixel.

The obtaining of the pieces of second feature data may include: obtaining pieces of query data, pieces of key data, and pieces of value data included in the first feature data, the pieces of query data, the pieces of key data, and the pieces of value data respectively corresponding to the first areas; obtaining a weight matrix, based on the pieces of query data and the pieces of key data; and obtaining the pieces of second feature data, based on the pieces of value data and the weight matrix.

The obtaining the weight matrix may include: obtaining a correlation matrix, based on the pieces of query data and the pieces of key data, and obtaining the weight matrix by applying, to the correlation matrix, a position bias based on a size of the first image and sizes of images used to train the at least one neural network.

The obtaining the pieces of fourth feature data may include: transforming the third feature data divided into third areas including the first number of pixels to be divided into the second areas; and obtaining the pieces of fourth feature data by performing the second image processing on each of the second areas.

The obtaining the pieces of fourth feature data may include: obtaining pieces of first query data, pieces of first key data, and pieces of first value data included in the third feature data, the pieces of first query data, the pieces of first key data, and the pieces of first value data respectively corresponding to third areas including the first number of pixels; obtaining pieces of second query data, pieces of second key data, and pieces of second value data corresponding to the second areas, by grouping the pieces of first query data, the pieces of first key data, and the pieces of first value data to respectively correspond to the second areas; obtaining a weight matrix, based on the pieces of second query data and the pieces of second key data; and obtaining the pieces of fourth feature data, based on the pieces of second value data and the weight matrix.

The third feature data is obtained from the pieces of second feature data.

The at least one neural network may include at least one convolutional neural network, and the obtaining of the first feature data may include extracting the first feature data from the first image, by using the at least convolutional neural network.

The at least one neural network may include at least one convolutional neural network, the generating the second image may include: obtaining fifth feature data, based on the pieces of second feature data and the pieces of fourth feature data; and obtaining the second image from the fifth feature data, by using the at least one convolutional neural network.

At least one computer-readable recording medium may store a program for executing the above methods.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram illustrating a transform block, according to an embodiment of the disclosure;

FIG. 5 is a diagram illustrating a self-attention operation performed in a first self-attention module, according to an embodiment of the disclosure;

FIG. 6 is a diagram illustrating a first self-attention module, according to an embodiment of the disclosure;

FIG. 10 is a diagram illustrating a second self-attention module, according to an embodiment of the disclosure;

FIG. 11 is a diagram illustrating a second self-attention module, according to an embodiment of the disclosure;

FIG. 13 is a diagram illustrating a transform block, according to an embodiment of the disclosure;

DETAILED DESCRIPTION

Figure 1:
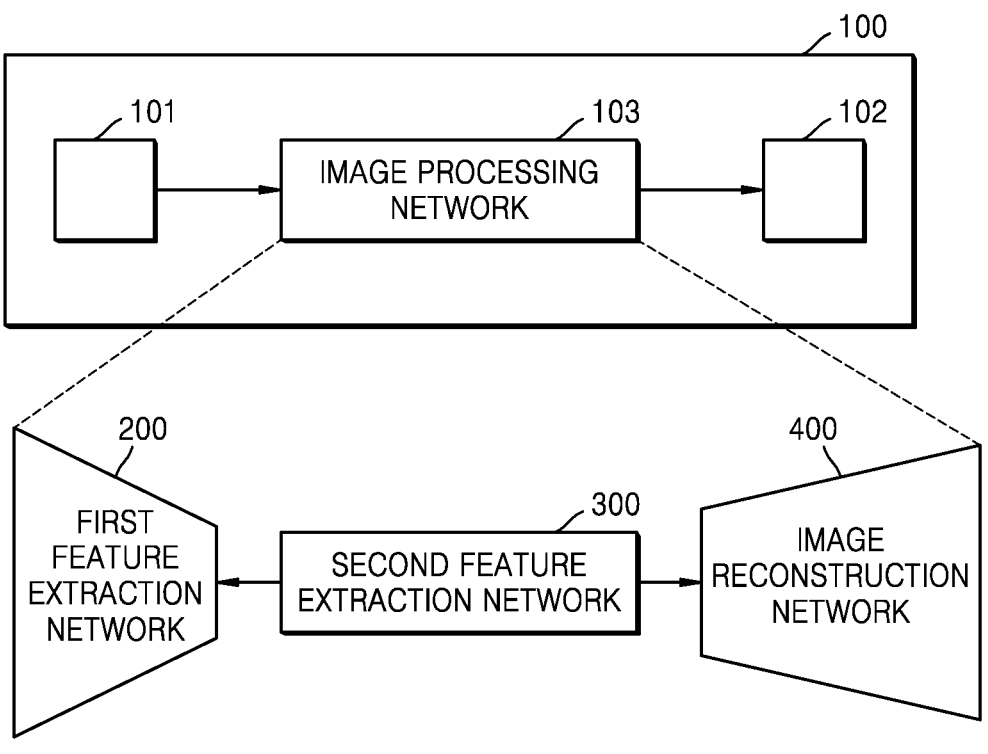
FIG. 1 is a diagram illustrating an operation in which an image processing apparatus processes an image by using an image processing network, according to an embodiment of the disclosure.

Throughout the disclosure, the expression "at least one of a, b or c" indicates only a, only b, only c, both a and b, both a and c, both b and c, or all of a, b, and c.

The terms used herein will be briefly described, and the disclosure will be described in detail.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

It will be understood that when a certain part "includes" a certain component, the part does not exclude another component but may further include another component, unless the context clearly dictates otherwise. Also, the term such as " . . . unit" or " . . . module" refers to a unit that performs at least one function or operation, and the unit may be implemented as hardware or software or as a combination of hardware and software.

The disclosure will now be described more fully with reference to the accompanying drawings for one of ordinary skill in the art to be able to perform the disclosure without any difficulty. However, the disclosure may be embodied in many different forms and is not limited to the embodiments of the disclosure set forth herein. For clarity, portions irrelevant to the descriptions of the disclosure are omitted in the drawings, and like components are denoted by like reference numerals throughout the specification.

FIG. 1 is a diagram illustrating an operation in which an image processing apparatus processes an image by using an image processing network, according to an embodiment of the disclosure.

Referring to FIG. 1, an image processing network 103 may receive a first image 101, may process the first image 101, and may generate a second image 102. The first image 101 may include noise or artifacts, and may be a low-resolution image or a low-quality image. An image processing apparatus 100 may generate the second image 102 by performing denoising to remove noise while maintaining a fine edge and texture of the first image 101. Also, the second image 102 may be an image having a higher resolution than that of the first image 101. Also, the second image 102 may be an image having better image quality than that of the first image 101. However, the disclosure is not limited thereto.

The image processing network 103 according to an embodiment of the disclosure may include one or more neural networks. For example, the image processing network 103 may include a first feature extraction network 200, a second feature extraction network 300, and an image reconstruction network 400. However, embodiments of the disclosure are not limited thereto.

The first feature extraction network 200 that maps from an image space where the first image 101 (input image) exists to a feature space may include one or more neural networks, such as convolutional neural networks (CNNs). Also, the second feature extraction network 300 may extract a higher-dimensional feature than a feature extracted by the first feature extraction network 200, based on the feature extracted by the first feature extraction network 200.

Also, the image reconstruction network 400 may obtain the second image 102 (output image), by using a high-dimensional feature. The image reconstruction network 400 may include one or more neural networks, such as CNNs. The image reconstruction network 400 may generate a second image having a higher resolution than that of a first image, by performing up-sampling. However, embodiments of the disclosure are not limited thereto, and the image processing network 103 according to an embodiment of the disclosure may include various other neural networks.

An image processing network according to an embodiment of the disclosure will be described in detail with reference to the drawings.

Figure 2:
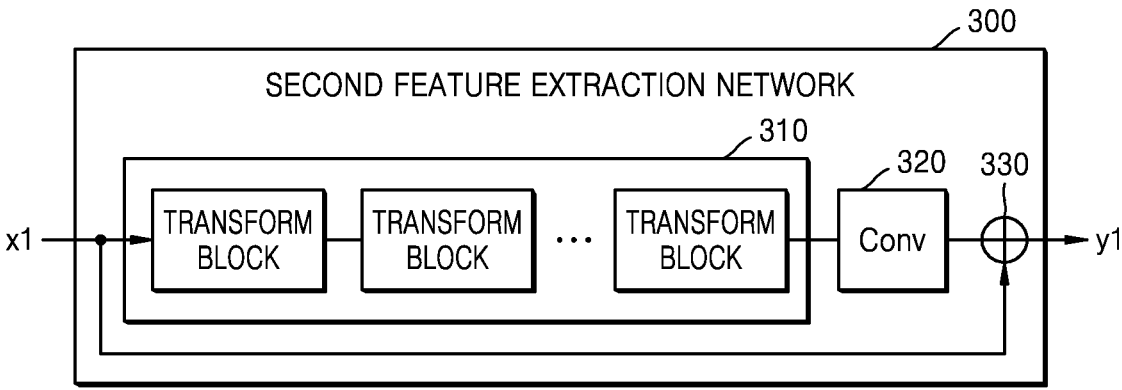
FIG. 2 is a diagram illustrating a second feature extraction network, according to an embodiment of the disclosure.

FIG. 2 is a diagram illustrating a second feature extraction network 300, according to an embodiment of the disclosure.

Referring to FIG. 2, the second feature extraction network 300 according to an embodiment of the disclosure may include one or more transform blocks 310, a convolution layer 320, and a summation layer 330.

Each of the transform blocks 310 according to an embodiment of the disclosure may extract second feature data, by using information about peripheral pixels adjacent to each of pixels included in input first feature data and information about peripheral areas adjacent to each of certain unit areas included in the input first feature data. A transform block will be described in detail with reference to FIG. 3.

In the convolution layer 320 according to an embodiment of the disclosure, a convolution operation may be performed between input data (or input information) that is input to the convolution layer 320 and a kernel included in the convolution layer 320. In one embodiment, the input data input to the convolution layer 320 may be a result data output after an operation is performed on the transform blocks 310. Also, although the second feature extraction network 300 includes one convolution layer 320 in FIG. 2, embodiments of the disclosure are not limited thereto and the second feature extraction network 300 may include two or more convolution layers.

In the summation layer 330 according to an embodiment of the disclosure, an element-wise summation operation may be performed on input data x1 input to the second feature extraction network 300 and output data output from the convolution layer 320. Output data y1 output from the summation layer 330 may be input to the image reconstruction network 400 of FIG. 1. However, embodiments of the disclosure are not limited thereto.

FIG. 3 is a diagram illustrating a transform block 311, according to an embodiment of the disclosure.

A transform block 311 of FIG. 3 may be any one of the transform blocks 310 of FIG. 2. Referring to FIG. 3, the transform block 311 according to an embodiment of the disclosure may include one or more first residual transform blocks and one or more second residual transform blocks.

The first residual transform block 350 according to an embodiment of the disclosure may be referred to as an intra residual transformer block aRTB, and the second residual transform block 370 may be referred to as an inter-residual transformer block eRTB.

Also, the transform block 311 according to an embodiment of the disclosure may have a structure in which the first residual transform block 350 and the second residual transform block 370 are alternately arranged. However, embodiments of the disclosure are not limited thereto, and the transform block 311 may have a structure in which the first residual transform block 350 and the second residual transform block 370 are arranged in parallel.

The first residual transform block 350 may include one or more first transform layers 351, a convolution layer 352, and a summation layer 353. The first transform layer will be described in detail with reference to FIG. 4.

In the convolution layer 352 according to an embodiment of the disclosure, a convolution operation may be performed between input data (or input information) that is input to the convolution layer 352 and a kernel included in the convolution layer 352. In an embodiment, the input data that is input to the convolution layer 352 may be a result data output after an operation is performed on the first transform layers 351. Also, although the first residual transform block 350 includes one convolution layer 352 in FIG. 3, embodiments of the disclosure are not limited thereto, and the first residual transform block 350 may include two or more convolution layers.

In the summation layer 353 according to an embodiment of the disclosure, an element-wise summation operation may be performed between input data that is input to the first residual transform block 350 and output data that is output from the convolution layer 352. Data output from the summation layer 353 may be an input to the second residual transform block 370. However, embodiments of the disclosure are not limited thereto.

Also, referring to FIG. 3, the second residual transform block 370 may include one or more second transform layers 371, a convolution layer 372, and a summation layer 373. The second transform layer will be described in detail with reference to FIG. 8.

In the convolution layer 372 according to an embodiment of the disclosure, a convolution operation may be performed between input data (or input information) that is input to the convolution layer 372 and a kernel included in the convolution layer 372. In an embodiment, the input data that is input to the convolution layer 372 may be a result data output after an operation is performed on the second transform layers 371. Also, although the second residual transform block 370 includes one convolution layer 372 in FIG. 3, embodiments of the disclosure are not limited thereto, and the second residual transform block 370 may include two or more convolution layers.

In the summation layer 373 according to an embodiment of the disclosure, an element-wise summation operation may be performed between input data that is input to the second residual transform block 370 and output data that is output from the convolution layer 372. Data output from the summation layer 373 may be an input to a first residual transform block located next to the second residual transform block 370. However, embodiments of the disclosure are not limited thereto.

Figure 4:
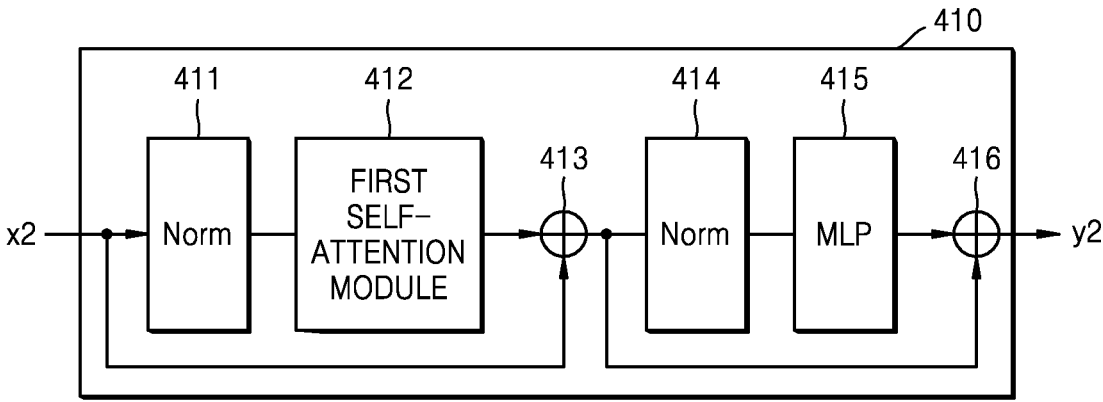
FIG. 4 is a diagram illustrating a first transform layer, according to an embodiment of the disclosure.

FIG. 4 is a diagram illustrating a first transform layer 410, according to an embodiment of the disclosure.

The first transform layer 410 of FIG. 4 may be any one of the first transform layers 351 of FIG. 3. Referring to FIG. 4, the first transform layer 410 according to an embodiment of the disclosure may include a first normalization layer 411, a first self-attention module 412, a first summation layer 413, a second normalization layer 414, a multi-layer perceptron (MLP) module 415, and a second summation layer 416.

The first normalization layer 411 according to an embodiment of the disclosure may normalize input data x2 input to the first transform layer 410. For example, the first normalization layer 411 may normalize the input data x2 so that a sum of input data that is input to the first transform layer 410 is 1. However, the disclosure is not limited thereto. In one embodiment, the first normalization layer 411 may normalize input data by using any of various normalization methods. The normalized input data may be an input to the first self-attention module 412.

The first self-attention module 412 according to an embodiment of the disclosure may perform a self-attention operation on first feature data (e.g., normalized input data) input to the first self-attention module 412, to obtain pieces of second feature data corresponding to first areas including a first number of pixels. In an embodiment, the first number may be one pixel.

An attention operation refers to an operation of obtaining correlation information (e.g., similarity information) between query data Q and key data K, obtaining a weight based on the correlation information, reflecting the weight in value data V mapped to the key data K, and performing a weighted sum on the value data Vin in which the weight is reflected.

In one embodiment, an attention operation performed based on query data Q, key data K, and value data V obtained from the same input data may be referred to as a self-attention operation.

A self-attention operation performed in the first self-attention module 412 according to an embodiment of the disclosure will be described in detail with reference to FIGS. 5 and 6.

Figure 5:
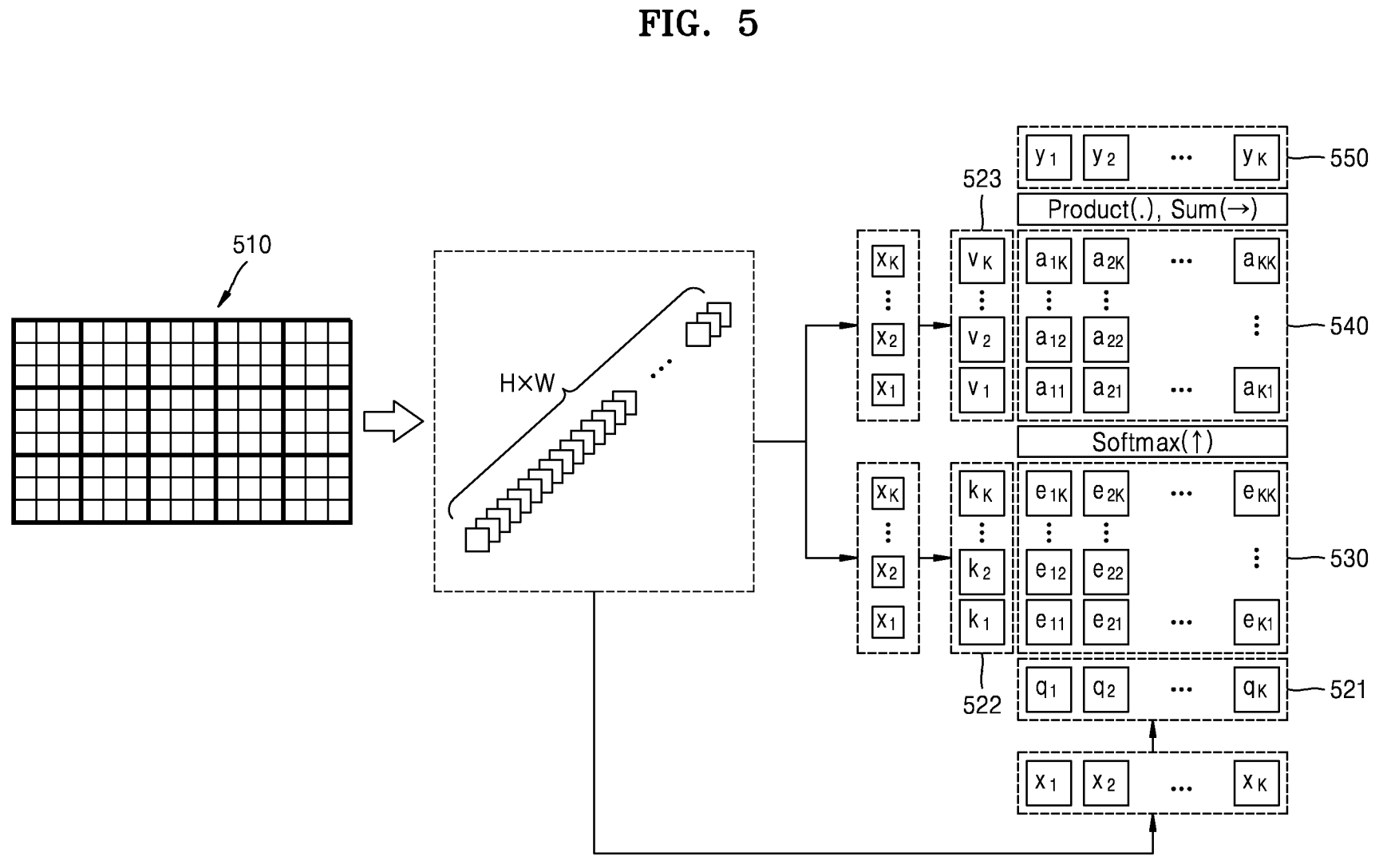

FIG. 5 is a diagram illustrating a self-attention operation performed in a first self-attention module, according to an embodiment of the disclosure.

The first self-attention module 412 according to an embodiment of the disclosure may be referred to as an intra multi-head self-attention (MSA) module.

Referring to FIG. 5, in the first self-attention module 412, query data Q, key data K, and value data V may be obtained, based on first input data 510 that is input to the first self-attention module 412.

For example, a size of the first input data 510 may be W×H, and the number of channels may be C. For convenience of explanation, FIG. 5 will be described assuming that the first input data 510 includes one channel (C=1).

The first self-attention module 412 may perform self-attention processing on pixels included in the first input data 510 in units of patches having a size of M×M. For example, the first self-attention module 412 may perform self-attention processing in units of $M^2$ pixels included in one patch. In FIG. 5, for convenience of explanation, a self-attention operation will be described based on pixels $x_1, x_2, \ldots, x_K$ included in one patch. Here, K is $M^2$.

Referring to FIG. 5, pieces of query data 521 respectively corresponding to the pixels $x_1, x_2, \ldots, x_K$ may be obtained through a multiplication operation between the pixels $x_1, x_2, \ldots, x_K$ included in one patch and a first weight matrix $W_{Q1}$. Also, pieces of key data 522 respectively corresponding to the pixels $x_1, x_2, \ldots, x_K$ may be obtained through a multiplication operation between the pixels $x_1, x_2, \ldots, x_K$ and a second weight matrix $W_{K1}$. Also, pieces of value data 523 respectively corresponding to the pixels $x_1, x_2, \ldots, x_K$ may be obtained through a multiplication operation between the pixels $x_1$, $x_2$, . . . , $x_K$ and a third weight matrix $W_{V1}$.

Correlation data E 530 may be obtained through an element-wise multiplication operation between the pieces of key data 522 and the pieces of query data 521. For example, the correlation data E 530 may be calculated by Equation 1.

$$e_{ij} = q_i k_j \qquad \text{[Equation 1]}$$

In Equation 1, $e_{ij}$ denotes an element at a position (i, j) in the correlation data E 530, $q_i$ denotes query data corresponding to an $i^{th}$ pixel xi from among the pieces of query data 521, and $k_j$ denotes key data corresponding to a $j^{th}$ pixel xj from among the pieces of key data 522.

The first self-attention module 412 may obtain weight data A 540, by applying a softmax function to the correlation data E 530. For example, the weight data A 540 may be calculated by Equation 2.

$$a_{ij} = \frac{e^{e_{ij}}}{\sum_{j=1}^{K} e^{e_{ij}}} \qquad \text{[Equation 2]}$$

In Equation 2, $a_{ij}$ denotes an element at a position (i, j) in the weight data A 540, and $e_{ij}$ denotes an element at a position (i, j) in the correlation data E 530.

The first self-attention module 412 may obtain first output data 550 corresponding to the pixels $x_1$, $x_2$, . . . , $x_K$, by performing a weighted sum on the weight data A 540 and the pieces of value data 523. For example, the first output data 550 may be calculated by Equation 3.

$$y_i = \sum_{j=1}^{K} v_j a_{ij} \qquad \text{[Equaiton 3]}$$

In Equation 3, $y_i$ denotes a feature value corresponding to the pixel $x_i$ included in the pixels $x_1$, $x_2$, . . . , $x_K$, in the first output data 550.

Figure 6:
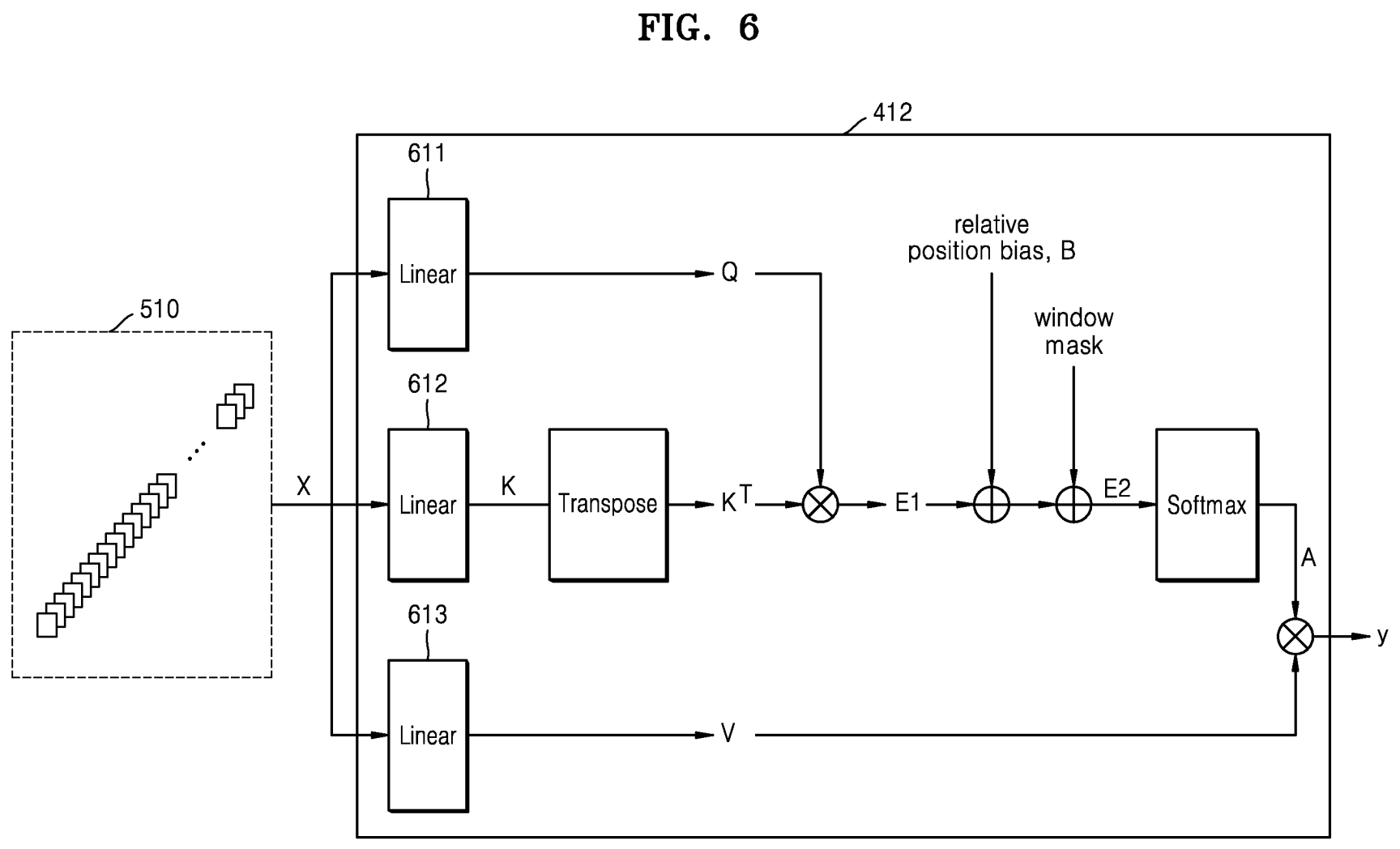

FIG. 6 is a diagram illustrating a first self-attention module, according to an embodiment of the disclosure.

Referring to FIG. 6, the first self-attention module 412 according to an embodiment of the disclosure may include three linear layers (e.g., a first linear layer 611, a second linear layer 612, and a third linear layer 613) that are arranged in parallel. The three linear layers (e.g., the first linear layer 611, the second linear layer 612, and the third linear layer 613) may be fully-connected layers.

For example, query data Q corresponding to first input data x 510 may be obtained through a multiplication operation between the first input data x 510 and a first weight matrix $W_{Q1}$ included in the first linear layer 611. Also, key data K may be obtained through a multiplication operation between the first input data x 510 and a second weight matrix $W_{K1}$ included in the second linear layer 612. Also, value data V may be obtained through a multiplication operation between the first input data x 510 and a third weight matrix $W_{V1}$ included in the third linear layer 613.

The first self-attention module 412 may obtain first correlation data E1 through an element-wise multiplication operation between the query data Q and data $K^T$ obtained by applying a transpose function to the key data K.

The first self-attention module 412 may obtain second correlation data E2, by adding a position bias B to the first correlation data E1 and applying a window mask.

The position bias B may be determined by Equation 4.

$$B[d(x_i, x_j)] = B_{train}[d(x_i, x_j)] \qquad \text{[Equation 4]}$$

Here, B[ ] may denote a position bias to be applied to the first correlation data, and $d(x_i, x_j)$ may denote a distance between a pixel $x_i$ and a pixel $x_j$. Also, $B_{train}[d(x_i, x_j)]$ that is a value determined through training of a neural network may be a pre-stored value.

Reflection padding may be applied to the first input data x 510 input to the first self-attention module 412. The reflection padding refers to an operation of performing padding when a size of the first input data x 510 is a multiple of a patch size, for example, when a width W of the first input data x 510 is not a multiple of a patch size M or a height H of the first input data x 510 is not a multiple of the patch size M, so that a size of the first input data is a multiple of the patch size. For example, when a size (resolution) of the first input data x 510 is 126×127 and a patch size M=8, the first self-attention module 412 may perform reflection padding so that a size (resolution) of the first input data x 510 is 128×128.

Also, the first input data x 510 may be shifted, by applying a window mask. For example, the first self-attention module 412 may shift a patch partitioning position, by applying a window mask. Patches may be arranged in more various ways by shifting a patch partitioning position, and as patches including one pixel are arranged in various ways, pixels adjacent to the pixel may be arranged in more various ways.

The first self-attention module 412 may obtain weight data A, by applying a softmax function to the second correlation data E2.

The first self-attention module 412 may obtain first output data y, by performing a weighted sum on the weight data A and the value data V.

Referring back to FIG. 4, the first output data y output from the first self-attention module 412 may be an output to the first summation layer 413. In the first summation layer 413, an element-wise summation operation may be performed between the first output data y that is output from the first self-attention module 412 and the input data "X2" input to the first transform layer 410.

The second normalization layer 414 may normalize second output data output from the first summation layer 413. The normalized data may be an input to the MLP module 415. The MLP module 415 will be described in detail with reference to FIG. 7.

Figure 7:
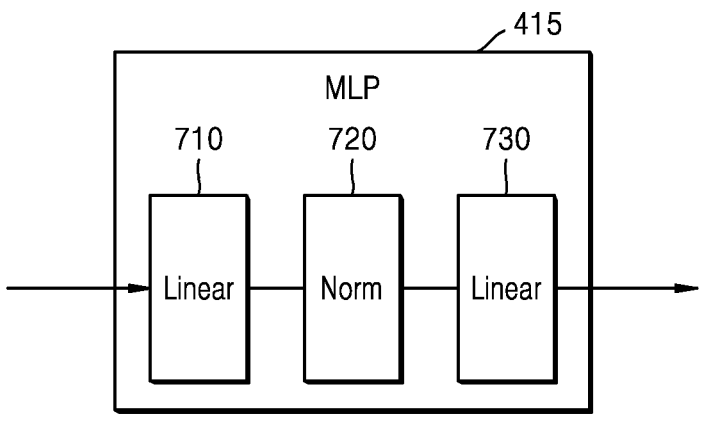
FIG. 7 is a diagram illustrating a multi-layer perceptron module, according to an embodiment of the disclosure.

FIG. 7 is a diagram illustrating an MLP module, according to an embodiment of the disclosure.

Referring to FIG. 7, the MLP module 415 according to an embodiment of the disclosure may include a first linear layer 710, a normalization layer 720, and a second linear layer 730.

In the first linear layer 710, third output data may be obtained through a multiplication operation between data input to the first linear layer 710 and a first weight matrix included in the first linear layer 710. The third output data may be an input to the normalization layer 720. In the normalization layer 720, the data that is input to the normalization layer 720 may be normalized. The normalized data may be an input to the second linear layer 730.

In the second linear layer 730, fourth output data may be obtained through a multiplication operation between the data that is input to the second linear layer 730 and a second weight matrix included in the second linear layer 730.

Although the MLP module 415 includes two linear layers in FIG. 7, embodiments of the disclosure are not limited thereto, and the MLP module 415 may include three or more linear layers.

Referring back to FIG. 4, the fourth output data obtained in the MLP module 415 may be an output to the second summation layer 416. In the second summation layer 416, an element-wise summation operation may be performed between the fourth output data that is output from the MLP module 415 and the second output data that is output from the first summation layer 413.

Figure 8:
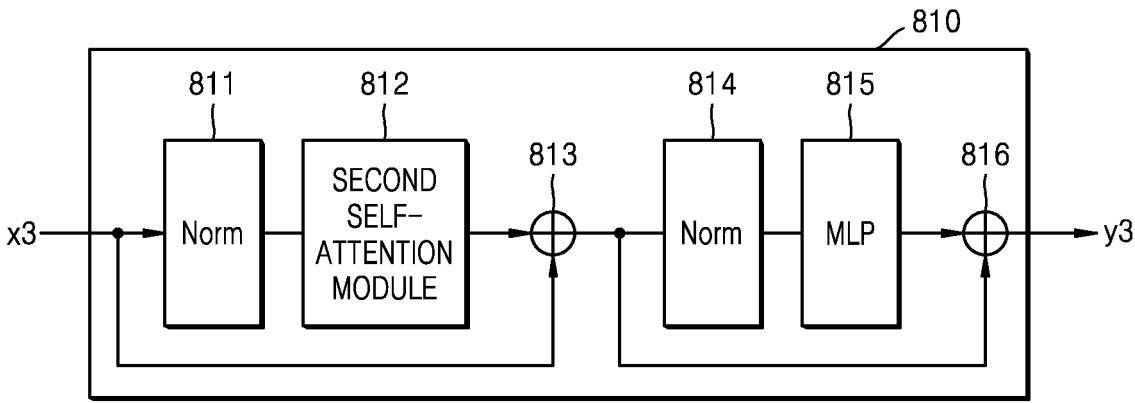
FIG. 8 is a diagram illustrating a second transform layer, according to an embodiment of the disclosure.

FIG. 8 is a diagram illustrating a second transform layer, according to an embodiment of the disclosure.

A second transform layer 810 of FIG. 8 may be any one of the second transform layers 371 of FIG. 3. Referring to FIG. 8, the second transform layer 810 according to an embodiment of the disclosure may include a first normalization layer 811, a second self-attention module 812, a first summation layer 813, a second normalization layer 814, a multi-layer perceptron (MLP) module 815, and a second summation layer 816.

The first normalization layer 811 according to an embodiment of the disclosure may normalize input data x3 input to the second transform layer 810. For example, the first normalization layer 811 may normalize input data so that a sum of input data input to the second transform layer 810 is 1. However, embodiments of the disclosure are not limited thereto, and the first normalization layer 811 may normalize input data by using any of various normalization methods. The normalized input data may be an input to the second self-attention module 812.

The second self-attention module 812 according to an embodiment of the disclosure may perform a self-attention operation on third feature data (e.g., normalized input data) input to the second self-attention module 812, to obtain pieces of fourth feature data corresponding to second areas including a second number of pixels. In an embodiment, the second number may be greater than the first number described in FIG. 5, the second areas may be greater than the first areas, and each of the second areas may include a plurality of pixels.

A self-attention operation performed in the second self-attention module 812 according to an embodiment of the disclosure will be described in detail with reference to FIGS. 9 and 10.

Figure 9:
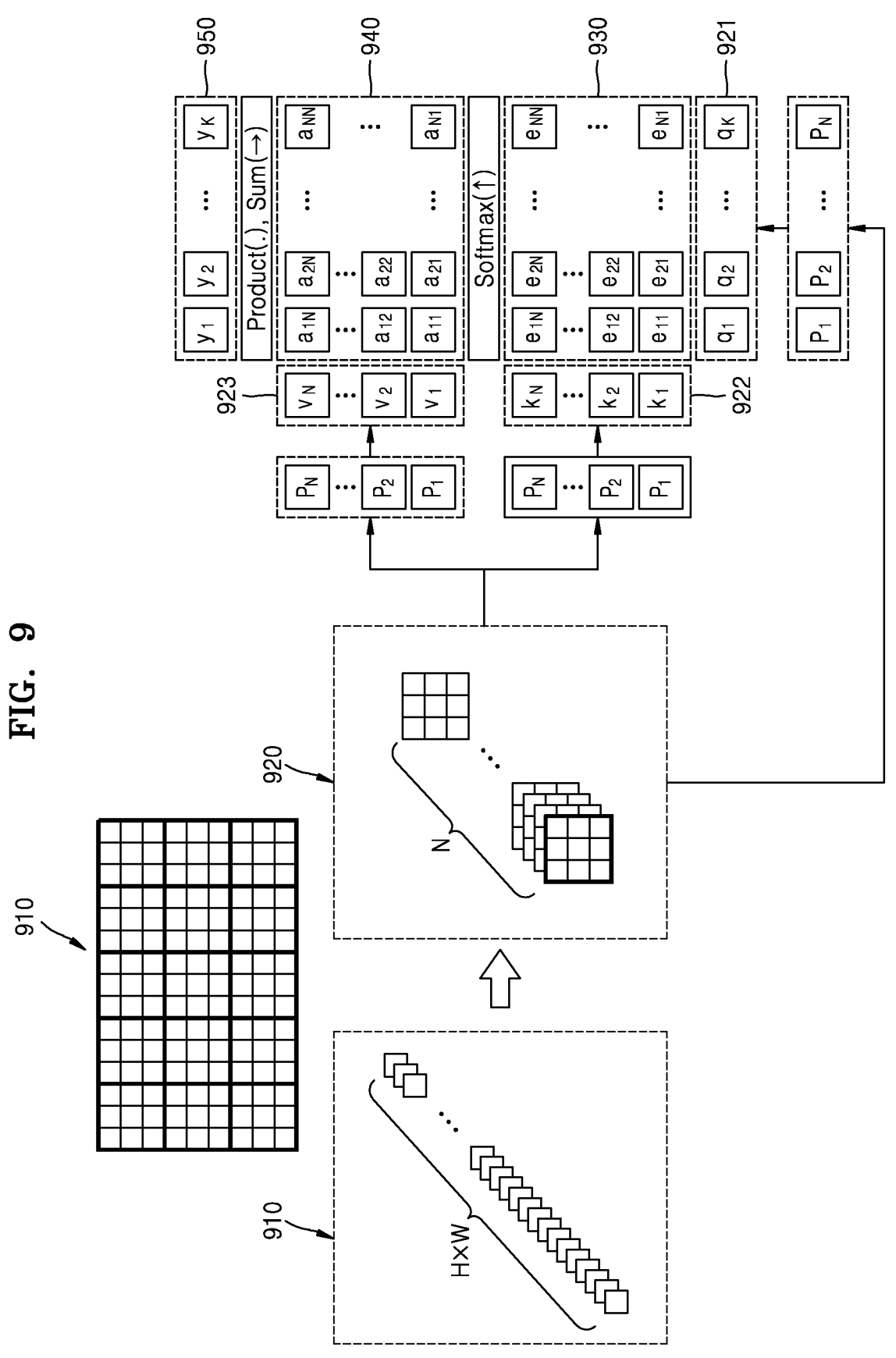
FIG. 9 is a diagram illustrating a self-attention operation performed in a second self-attention module, according to an embodiment of the disclosure.

FIG. 9 is a diagram illustrating a self-attention operation performed in a second self-attention module, according to an embodiment of the disclosure.

The second self-attention module 812 according to an embodiment of the disclosure may be referred to as an inter multi-head self-attention (MSA) module.

Referring to FIG. 9, in the second self-attention module 812, query data Q, key data K, and value data V may be obtained, based on second input data 910 input to the second self-attention module 812.

For example, a size of the second input data 910 may be W×H, and the number of channels may be C. For convenience of explanation, FIG. 9 will be described assuming that the second input data 910 includes one channel (C=1). When the second input data 910 is divided into areas (patches) including a certain number (e.g., $M^2$) of pixels, the number of patches included in one channel may be N.

The second self-attention module 812 according to an embodiment of the disclosure may obtain feature information corresponding to each of patches $P_1$, $P_2$, . . . , $P_N$.

For example, pieces of query data 921 respectively corresponding to the patches 920 $P_1$, $P_2$, . . . , $P_N$ included in the second input data 910 may be obtained through a multiplication operation between the patches 920 $P_1$, $P_2$, . . . , $P_N$ included in the second input data 910 and a first weight matrix $W_{Q2}$.

Also, pieces of key data 922 (respectively corresponding to the patches 920 $P_1$, $P_2$, . . . , $P_N$ included in the second input data 910) may be obtained through a multiplication operation between the patches 920 $P_1$, $P_2$, . . . , $P_N$ included in the second input data 910 and a second weight matrix $W_{K2}$.

Also, pieces of value data 923 (respectively corresponding to the patches 920 $P_1$, $P_2$, . . . , $P_N$ included in the second input data 910) may be obtained through a multiplication operation between the patches 920 $P_1$, $P_2$, . . . , $P_N$ included in the second input data 910 and a third weight matrix $W_{V2}$.

Correlation data E 930 may be obtained through an element-wise multiplication operation between the pieces of key data 922 and the pieces of query data 921, which has been described in Equation 1 of FIG. 5, and thus, the descriptions of the same elements will be omitted.

Weight data A 940 may be obtained, by applying a softmax function to the correlation data E 930, which has been described in Equation 2 of FIG. 5, and thus, the descriptions of the same elements will be omitted.

The second self-attention module 812 may obtain second output data 950, by performing a weighted sum on the weight data A 940 and the pieces of value data 923, which has been described in Equation 3 of FIG. 5, and thus, the same description will be omitted.

Figure 10:
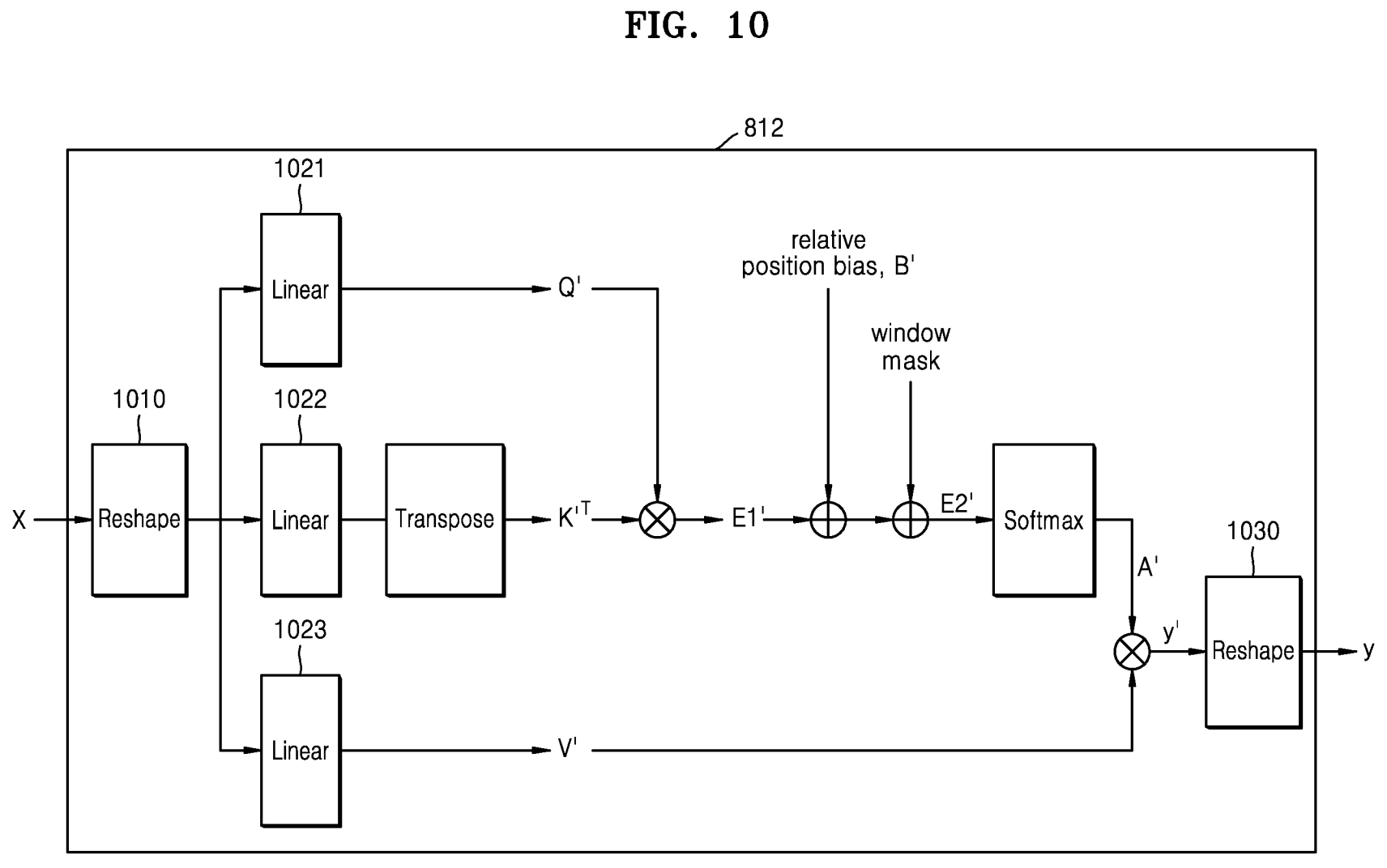

FIG. 10 is a diagram illustrating a second self-attention module, according to an embodiment of the disclosure.

Referring to FIG. 10, the second self-attention module 812 according to an embodiment of the disclosure may include a first reshape layer 1010. In the first reshape layer 1010, third input data may be obtained by reshaping second input data so that pixels included in the same patch from among pixels included in the second input data 910 are grouped. In an embodiment, the third input data may be divided into the patches 920 of FIG. 9.

The second self-attention module 812 according to an embodiment of the disclosure may include three linear layers (e.g., a first linear layer 1021, a second linear layer 1022, and a third linear layer 1023) that are arranged in parallel. The three linear layers (e.g., the first linear layer 1021, the second linear layer 1022, and the third linear layer 1023) may be fully-connected layers.

For example, query data Q' corresponding to third input data may be obtained through a multiplication operation between the third input data and a first weight matrix $W_{Q2}$ included in the first linear layer 1021. Also, key data K' may be obtained through a multiplication operation between the third input data and a second weight matrix $W_{K2}$ included in the second linear layer 1022. Also, value data V may be obtained through a multiplication operation between the third input data and a third weight matrix $W_{V2}$ included in the third linear layer 1023.

The second self-attention module 812 may obtain first correlation data E1' through an element-wise multiplication operation between the query data Q' and data $K'^T$ obtained by applying a transpose function to the key data K'.

The second self-attention module 812 may obtain second correlation data E2', by adding a position bias B' to the first correlation data E1' and applying a window mask.

The position bias B' may be determined by Equation 5.

$$B'[d(P_iP_j)] = \begin{cases} B'_{train}[d(P_i, P_j)] & \text{if } d(P_i, P_j) \le d_{train}^{max} \\ -\infty & \text{otherwise} \end{cases} \quad \text{[Equation 5]}$$

Here, B'[ ] may denote a position bias to be applied to the first correlation data, and $d(P_i, P_j)$ may denote a distance between a patch $P_i$ and a patch $P_j$. Also, $B'_{train}[d(P_i, P_j)]$ that is a value determined through training of a neural network may be a pre-stored value.

Also, the second input data 910 may be shifted, by applying a window mask. For example, the second self-attention module 812 may shift a patch partitioning position, by applying a window mask. Patches may be arranged in various ways, by shifting a patch partitioning position. Accordingly, patches adjacent to one patch may be arranged in various ways.

The second self-attention module 812 may obtain weight data A', by applying a softmax function to the second correlation data E2'.

The second self-attention module 812 may obtain second output data y', by performing a weighted sum on the weight data A' and the value data V'.

In this case, the second output data y' may be divided into patches, and the second output data y' may be reshaped into third output data y in the second reshape layer 1030. The third output data y may be divided into pixels without being divided into patches.

Referring back to FIG. 8, the third output data y output from the second self-attention module 812 may be an output to the first summation layer 813. In the first summation layer 813, an element-wise summation operation may be performed between the third output data y output from the second self-attention module 812 and the input data x3 input to the second transform layer 810.

The second normalization layer 814 may normalize fourth output data output from the first summation layer 813. The normalized data may be an input to the MLP module 815. The MLP module 815 has been described in detail with reference to FIG. 7, and thus, the same description will be omitted.

Fifth output data obtained in the MLP module 815 may be an output to the second summation layer 816. In the second summation layer 816, an element-wise summation operation may be performed between the fifth output data output from the MLP module 815 and the fourth output data output from the first summation layer 813.

Figure 11:
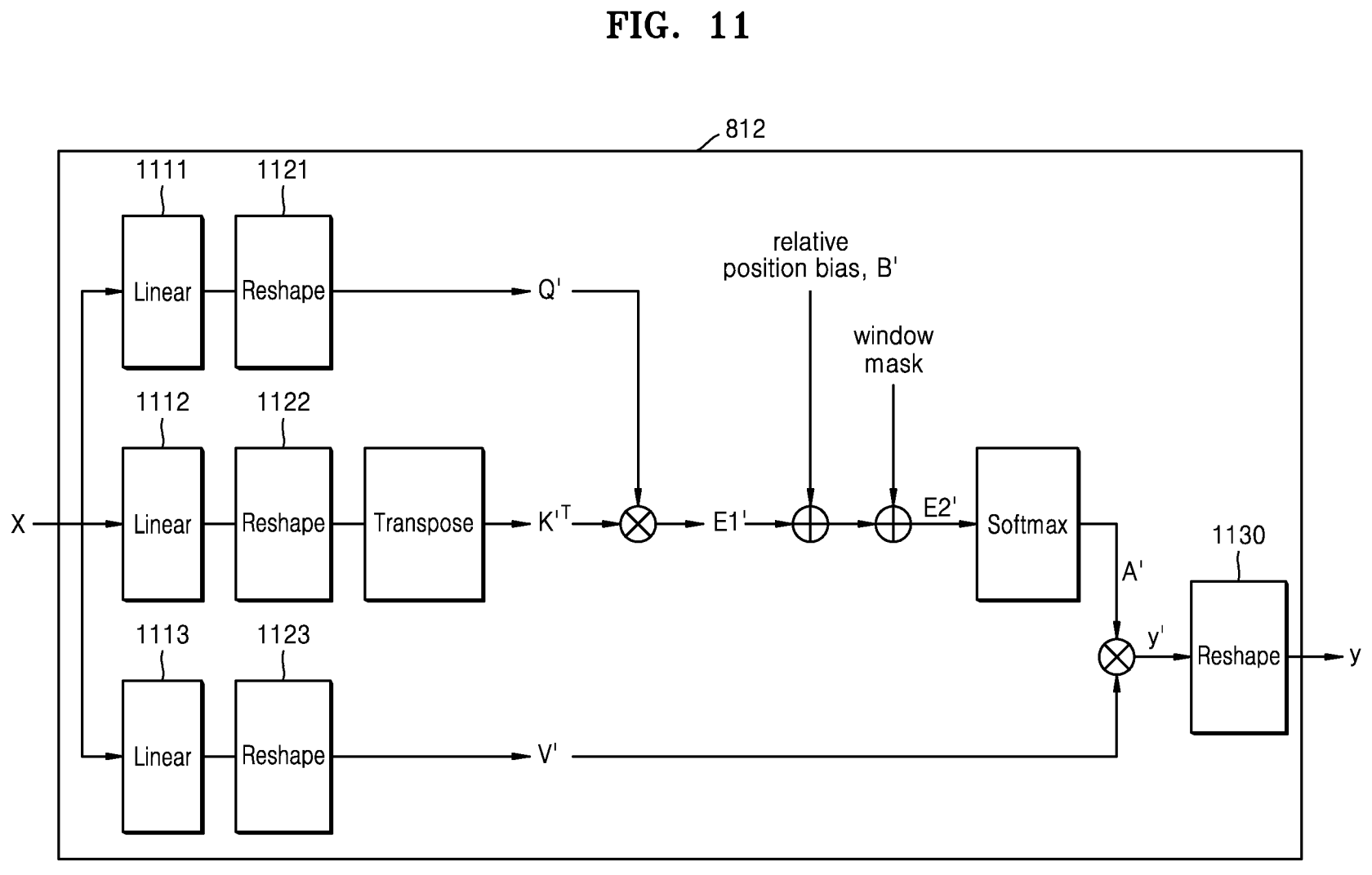

FIG. 11 is a diagram illustrating a second self-attention module, according to an embodiment of the disclosure.

Referring to FIG. 11, the second self-attention module 812 according to an embodiment of the disclosure may include three linear layers (e.g., a first linear layer 1111, a second linear layer 1112, and a third linear layer 1113) that are arranged in parallel. The three linear layers (e.g., the first linear layer 1111, the second linear layer 1112, and the third linear layer 1113) may be fully-connected layers.

For example, query data Q1' corresponding to second input data may be obtained through a multiplication operation between the second input data 910 x and a first weight matrix $W_{Q3}$ included in the first linear layer 1111. Also, key data K1' may be obtained through a multiplication operation between the second input data and a second weight matrix $W_{K3}$ included in the second linear layer 1112. Also, value data V1' may be obtained through a multiplication operation between the second input data and a third weight matrix $W_{V3}$ included in the third linear layer 1113.

The second self-attention module 812 according to an embodiment of the disclosure may include a first reshape layer 1121, a second reshape layer 1122, and a third reshape layer 1123. For example, the first reshape layer 1121 may be connected to the first linear layer 1111, and may obtain second query data Q' by reshaping the first query data Q1' output from the first linear layer 1111. For example, the second query data Q' may be formed by grouping query values corresponding to pixels included in the same patch from among query values respectively corresponding to pixels included in the first query data Q1'. That is, the second query data Q' may be divided into pieces of query data respectively corresponding to patches.

Also, the second reshape layer 1122 may be connected to the second linear layer 1112, and may obtain second key data K' by reshaping the first key data K1' output from the second linear layer 1112. For example, the second key data K' may be formed by grouping key values corresponding to pixels included in the same patch from among key values respectively corresponding to pixels included in the first key data K1'. That is, the second key data K' may be divided into pieces of key data respectively corresponding to patches.

Also, the third reshape layer 1123 may be connected to the third linear layer 1113, and may obtain second value data V by reshaping the first value data V1' output from the third linear layer 1113. For example, the second value data V' may be formed by grouping value values corresponding to pixels included in the same patch from among value values respectively corresponding to pixels included in the first value data V1'. That is, the second value data V may be divided into pieces of value data respectively corresponding to patches.

The second self-attention module 812 may obtain first correlation data E1' through an element-wise multiplication operation between the second query data Q' and data $K'^T$ obtained by applying a transpose function to the second key data K'.

The second self-attention module 812 may obtain second correlation data E2', by adding a position bias B' to the first correlation data E1' and applying a window mask.

The second self-attention module 812 may obtain weight data A', by applying a softmax function to the second correlation data E2'.

The second self-attention module 812 may obtain second output data y', by performing a weighted sum on the weight value A' and the value data V'.

In this case, the second output data y' may be divided into patches, and the second output data y' may be reshaped into third output data y in a fourth reshape layer 1130. The third output data y may be divided into pixels without being divided into patches.

In the second self-attention module 812 of FIG. 10, a size of the second input data x may be H×W×C, and a size of the reshaped third input data input to the first linear layer 1021, the second linear layer 1022, and the third linear layer 1023 may be N×M²×C. In one embodiment, N is the number of patches, M² is a size of one patch, and C is the number of channels, and H×W is the same as N×M². Accordingly, the number of parameters of a weight matrix included in each of the first linear layer 1021, the second linear layer 1022, and the third linear layer 1023 may be M²C×M²C.

In contrast, in the second self-attention module 812 of FIG. 11, a size of the second input data input to the first linear layer 1111, the second linear layer 1112, and the third linear layer 1113 may be H×W×C, and thus, the number of parameters of a weight matrix included in each of the first linear layer 1111, the second linear layer 1112, and the third linear layer 1113 may be C×C.

Accordingly, the amount of calculation and the number of calculation parameters when second input data is calculated in linear layers and then reshaped to be grouped into pieces of data corresponding to patches as shown in FIG. 11 may be less than the amount of calculation and the number of calculation parameters when second input data is reshaped to be grouped into patches and then calculated in linear layers as shown in FIG. 10. Accordingly, the second self-attention module of FIG. 11 may perform image processing by using a smaller amount of calculation and a smaller number of calculation parameters while maintaining performance of image processing (inter self-attention).

Figure 12:
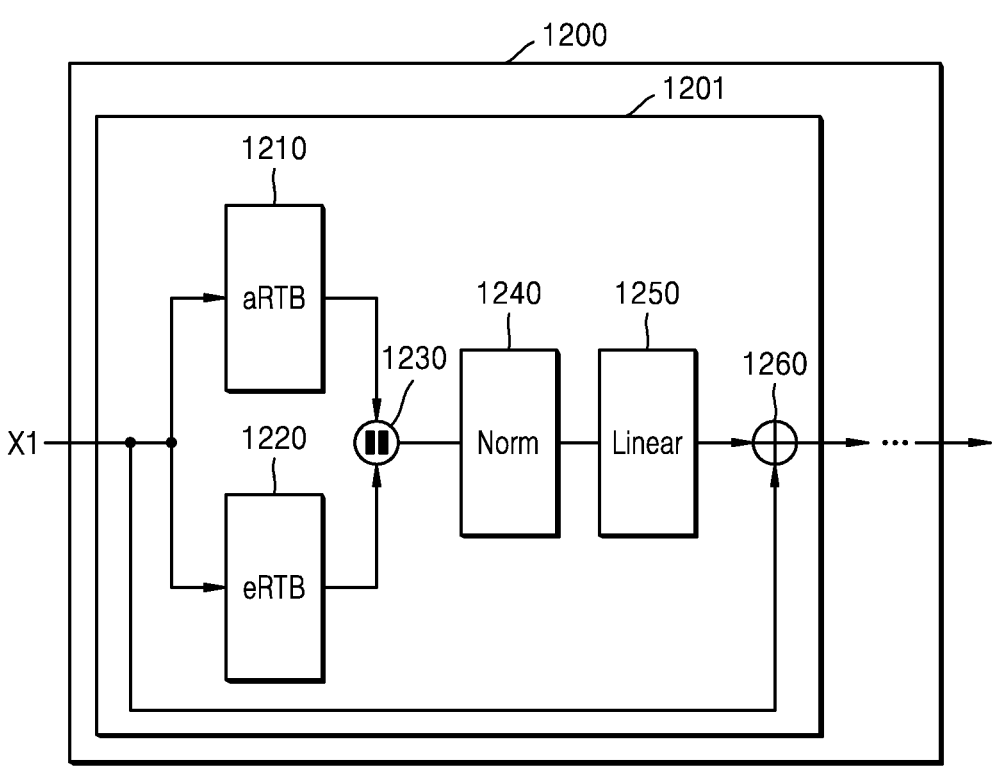
FIG. 12 is a diagram illustrating a transform block, according to an embodiment of the disclosure.

FIG. 12 is a diagram illustrating a transform block, according to an embodiment of the disclosure.

A transform block 1200 of FIG. 12 may be any one of the transform blocks 310 of FIG. 2.

Referring to FIG. 12, the transform block 1200 according to an embodiment of the disclosure may include a first residual transform block 1210, a second residual transform block 1220, a concatenation layer 1230, a normalization layer 1240, a linear layer 1250, and a summation layer 1260.

The transform block 1200 according to an embodiment of the disclosure may have a structure in which the first residual transform block 1210 and the second residual transform block 1220 are connected to each other in parallel.

The first residual transform block 1210 according to an embodiment of the disclosure may be referred to as an intra-residual transformer block (aRTB), and the second residual transform block 1220 may be referred to as an inter-residual transformer block (eRTB). The first residual transform block 1210 may correspond to the first residual transform block 350 of FIG. 3, and the second residual transform block 1220 may correspond to the second residual transform block 370 of FIG. 3. Accordingly, the first residual transform block 350, the second residual transform block 370, the first transform layer 410 included in the first residual transform block 350, and the second transform layer 810 included in the second residual transform block 370 described with reference to FIGS. 3 to 11 may be equally applied to the first residual transform block 1210 and the second residual transform block 1220 of FIG. 12, and thus, the same description will be omitted.

First input data X1 input to the transform block 1200 according to an embodiment of the disclosure may be an input to the first residual transform block 1210 and the second residual transform block 1220. First output data output from the first residual transform block 1210 and second output data output from the second residual transform block 1220 may be concatenated in the concatenation layer 1230. For example, in the concatenation layer 1230, third output data obtained by concatenating the first output data and the second output input to the concatenation layer 1230 in a channel direction may be an output to the normalization layer 1240. The third output data may be an input to and normalized by the normalization layer 1240, and normalized fourth output data may be an input to the linear layer 1250.

In the linear layer 1250, fifth output data may be obtained through a multiplication operation between the fourth output data input to the linear layer 1250 and a weight matrix included in the linear layer 1250. The fifth output data may be an input to the summation layer 1260. Also, the first input data X1 input to the transform block 1200 may be an input to the summation layer 1260.

In the summation layer 1260, an element-wise summation operation may be performed on the first input data and the fifth output data input to the summation layer 1260.

The transform block 1200 according to an embodiment of the disclosure may have a structure in which a module 1201 including the first residual transform block 1210, the second residual transform block 1220, the concatenation layer 1230, the normalization layer 1240, the linear layer 1250, and the summation layer 1260 is repeatedly arranged in series. However, the disclosure is not limited thereto.

Figure 13:
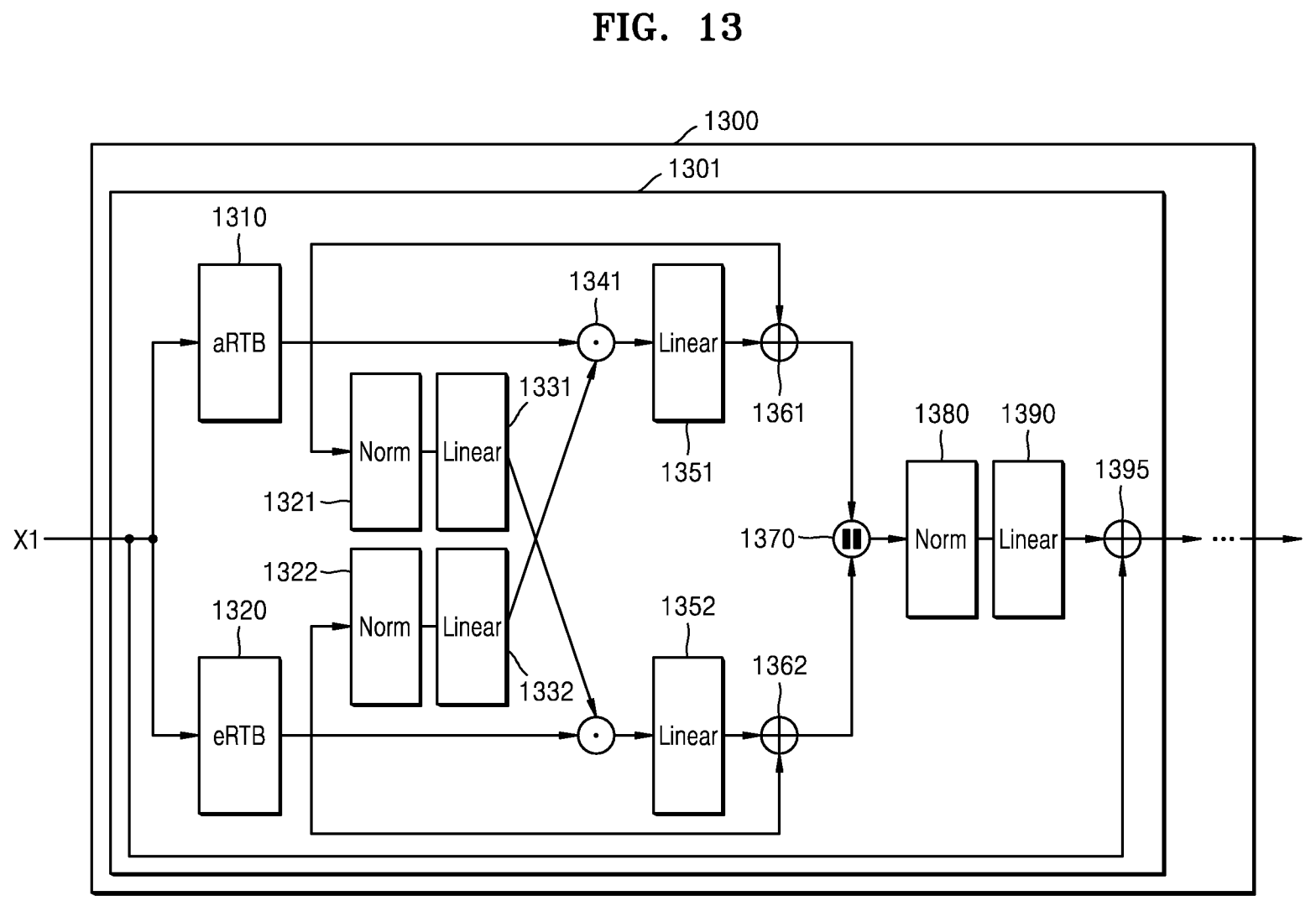

FIG. 13 is a diagram illustrating a transform block, according to an embodiment of the disclosure.

A transform block 1300 of FIG. 13 may be any one of the transform blocks 310 of FIG. 2.

Referring to FIG. 13, the transform block 1300 according to an embodiment of the disclosure may include a first residual transform block 1310, a second residual transform block 1320, a first normalization layer 1321, a second normalization layer 1322, a first linear layer 1331, a second linear layer 1332, a first attention layer 1341, a second attention layer 1342, a third linear layer 1351, a fourth linear layer 1352, a first summation layer 1361, a second summation layer 1362, a concatenation layer 1370, a third normalization layer 1380, a fifth linear layer 1390, and a third summation layer 1395.

The transform block 1300 according to an embodiment of the disclosure may have a structure in which the first residual transform block 1310 and the second residual transform block 1320 are connected to each other in parallel.

The first residual transform block 1310 according to an embodiment of the disclosure may be referred to as an intra-residual transformer block (aRTB), and the second residual transform block 1320 may be referred to as an inter-residual transformer block (eRTB). The first residual transform block 1310 may correspond to the first residual transform block 350 of FIG. 3, and the second residual transform block 1320 may correspond to the second residual transform block 370 of FIG. 3. Accordingly, the first residual transform block 350, the second residual transform block 370, the first transform layer 410 included in the first residual transform block 350, and the second transform layer 810 included in the second residual transform block 370 described with reference to FIGS. 3 to 11 may be equally applied to the first residual transform block 1310 and the second residual transform block 1320 of FIG. 13, and the same description will be omitted.

First input data X1 input to the transform block 1300 according to an embodiment of the disclosure may be an input to the first residual transform block 1310 and the second residual transform block 1320. First output data that is output from the first residual transform block 1310 may be an input to and normalized by the first normalization layer 1321, and normalized second output data may be an input to the first linear layer 1331.

In the first linear layer 1331, third output data may be obtained through a multiplication operation between first normalization data input to the first linear layer 1331 and a first weight matrix included in the first linear layer 1331.

The third output data may be used as an attention map that enables focusing on fourth output data output from the second residual transform block 1320. For example, the third output data and the fourth output data may be an input to the second attention layer 1342, and in the second attention layer 1342, an element-wise multiplication operation may be performed between the third output data and the fourth output data.

Also, the fourth output data that is output from the second residual transform block 1320 may be an input to and normalized by the second normalization layer 1322, and normalized fifth output data may be an input to the second linear layer 1332.

In the second linear layer 1332, sixth output data may be obtained through a multiplication operation between the fifth output data that is input to the second linear layer 1332 and a second weight matrix included in the second linear layer 1332.

The sixth output data may be used as an attention map that enables focusing on the first output data that is output from the first residual transform block 1310. For example, the first output data and the sixth output data may be inputs to the first attention layer 1341, and in the first attention layer 1341, an element-wise multiplication operation may be performed between the first output data and the sixth output data.

Seventh output data output from the first attention layer 1341 may be an input to the third linear layer 1351.

In the third linear layer 1351, eighth output data may be obtained through a multiplication operation between the seventh output data input to the third linear layer 1351 and a third weight matrix included in the third linear layer 1351. The eighth output data may be an input to the first summation layer 1361. Also, the first output data output from the first residual transform block 1310 may be an input to the first summation layer 1361. In the first summation layer 1361, an element-wise summation operation may be performed between the eighth output data input to the first summation layer 1361 and the first output data.

Also, ninth output data output from the second attention layer 1342 may be an input to the fourth linear layer 1352.

In the fourth linear layer 1352, tenth output data may be obtained through a multiplication operation between the ninth output data input to the fourth linear layer 1352 and a fourth weight matrix included in the fourth linear layer 1352. The tenth output data may be an input to the second summation layer 1362. Also, the fourth output data output from the second residual transform block 1320 may be an input to the second summation layer 1362. In the second summation layer 1362, an element-wise summation operation may be performed between the tenth output data input to the second summation layer 1362 and the fourth output data.

$11^{th}$ output data output from the first summation layer 1361 may be an input to the concatenation layer 1370.

$12^{th}$ output data output from the second summation layer 1362 may be an input to the concatenation layer 1370. In the concatenation layer 1370, $13^{th}$ output data obtained by concatenating the $11^{th}$ output data and the $12^{th}$ output data in a channel direction may be an output to the third normalization layer 1380. The $13^{th}$ output data may be an input to and normalized by the third normalization layer 1380, and normalized $14^{th}$ output data may be an input to the fifth linear layer 1390.

In the fifth linear layer 1390, $15^{th}$ output data may be obtained through a multiplication operation between the $14^{th}$ output data input to the fifth linear layer 1390 and a fifth weight matrix included in the fifth linear layer 1390. The $15^{th}$ output data may be an input to the third summation layer 1395. Also, the first input data X1 input to the transform block 1300 may be an input to the third summation layer 1395.

In the third summation layer 1395, $16^{th}$ output data may be obtained, by performing an element-wise summation operation between the $15^{th}$ output data input to the third summation layer 1395 and the first input data X1.

The transform block 1300 according to an embodiment of the disclosure may have a structure in which a module 1301 including the first residual transform block 1310, the second residual transform block 1320, the first normalization layer 1321, the second normalization layer 1322, the first linear layer 1331, the second linear layer 1332, the first attention layer 1341, the second attention layer 1342, the third linear layer 1351, the fourth linear layer 1352, the first summation layer 1361, the second summation layer 1362, the concatenation layer 1370, the third normalization layer 1380, the fifth linear layer 1390, and the third summation layer 1395 is repeatedly arranged in series. However, the disclosure is not limited thereto.

Figure 14:
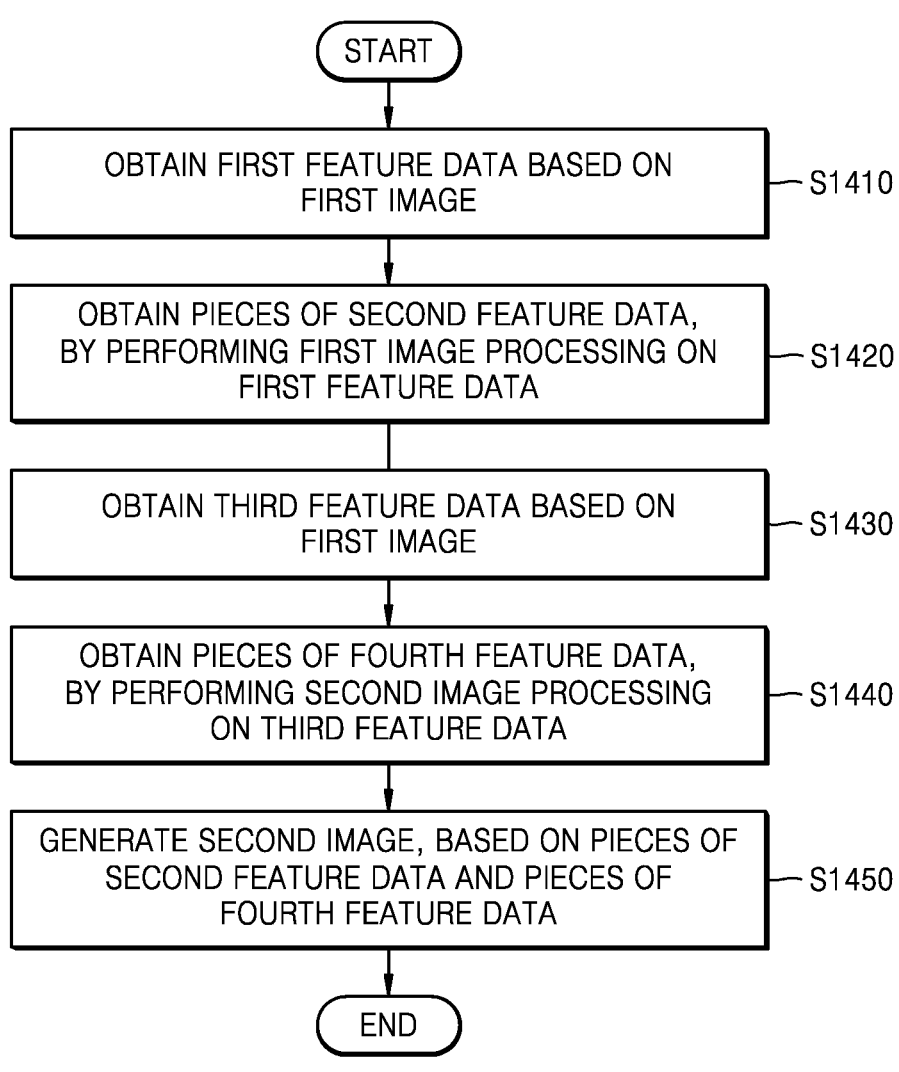
FIG. 14 is a flowchart illustrating a method of an image processing apparatus, according to an embodiment of the disclosure.

FIG. 14 is a flowchart illustrating a method of an image processing apparatus, according to an embodiment of the disclosure.

In S1410, the image processing apparatus 100 according to an embodiment of the disclosure may obtain first feature data based on a first image, by using one or more neural networks. For example, the image processing apparatus 100 may extract the first feature data corresponding to the first image, by using one or more convolutional neural networks.

In S1420, the image processing apparatus 100 according to an embodiment of the disclosure may obtain pieces of second feature data, by performing first image processing on the first feature data.

For example, the image processing apparatus 100 may obtain the pieces of second feature data corresponding to first areas including a first number of pixels in the first feature data. The image processing apparatus 100 may obtain the pieces of second feature data respectively corresponding to the first areas, based on information about peripheral areas of each of the first areas.

The image processing apparatus 100 may obtain the pieces of second feature data, by performing self-attention on the first feature data.

The image processing apparatus 100 according to an embodiment of the disclosure may obtain the pieces of second feature data corresponding to the first feature data, by using the first self-attention module 412 illustrated and described in FIGS. 5 and 6. An operation performed in the first self-attention module 412 has been described in detail with reference to FIGS. 5 and 6, and thus, the same description will be omitted.

In S1430, the image processing apparatus 100 according to an embodiment of the disclosure may obtain third feature data based on the first image.

For example, the image processing apparatus 100 may extract the third feature data corresponding to the first image, by using one or more convolutional neural networks. Alternatively, the image processing apparatus 100 may obtain the third feature data, based on the pieces of second feature data obtained in operation S1420. However, the disclosure is not limited thereto.

In S1440, the image processing apparatus 100 according to an embodiment of the disclosure may obtain pieces of fourth feature data, by performing second image processing on the third feature data.

For example, the image processing apparatus 100 may obtain the pieces of fourth feature data corresponding to second areas including a second number of pixels greater than the first number in the third feature data. The image processing apparatus 100 may obtain the pieces of fourth feature data respectively corresponding to the second areas, based on information about peripheral areas of each of the second areas.

The image processing apparatus 100 may obtain the pieces of fourth feature data, by performing self-attention on the third feature data.

The image processing apparatus 100 according to an embodiment of the disclosure may obtain the pieces of fourth feature data corresponding to the third feature data, by using the second self-attention module 812 illustrated and described in FIGS. 9 to 11. An operation performed in the second self-attention module 812 has been described in detail with reference to FIGS. 9 to 11, and thus, the same description will be omitted.

In S1450, the image processing apparatus 100 according to an embodiment of the disclosure may generate a second image, based on the pieces of second feature data and the pieces of fourth feature data.

For example, the pieces of second feature data may be feature data based on information about peripheral pixels adjacent to each of pixels included in the first image, and the pieces of fourth feature data may be feature data based on information about peripheral areas (patches) adjacent to each of certain unit areas (patches) included in the first image. Accordingly, the image processing apparatus 100 according to an embodiment of the disclosure may generate the second image, by using both information (local information) about adjacent peripheral pixels and information (non-local information) about adjacent peripheral areas.

In detail, the image processing apparatus 100 according to an embodiment of the disclosure may extract feature data from the second feature extraction network 300, may receive the extracted feature data, and may obtain the second image by using the image reconstruction network 400. In one embodiment, the second feature extraction network 300 may include a module (e.g., first self-attention module) that obtains pieces of second feature data, and a module (e.g., second self-attention module) that obtains pieces of fourth feature data.

The second image according to an embodiment of the disclosure may be an image having a higher resolution than that of the first image, and may be an image having better image quality than that of the first image by removing artifacts, noise, etc. from the first image.

Figure 15:
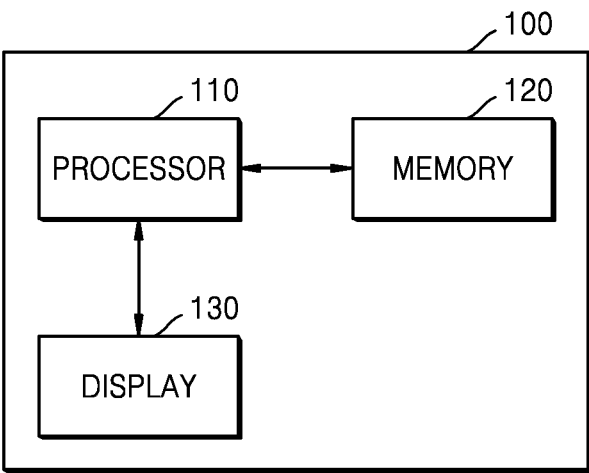
FIG. 15 is a block diagram illustrating a configuration of an image processing apparatus, according to an embodiment of the disclosure.

FIG. 15 is a block diagram illustrating a configuration of an image processing apparatus, according to an embodiment of the disclosure.

An image processing apparatus 100 of FIG. 15 may be an apparatus for performing image processing by using the image processing network 103. The image processing network 103 according to an embodiment of the disclosure may include one or more neural networks. For example, the image processing network 103 may include the first feature extraction network 200, the second feature extraction network 300, and the image reconstruction network 400. However, the disclosure is not limited thereto.

Referring to FIG. 15, the image processing apparatus 100 may include a processor 110, a memory 120, and a display apparatus 130.

The processor 110 according to an embodiment of the disclosure may control an overall operation of the image processing apparatus 100. The processor 110 according to an embodiment of the disclosure may execute one or more programs stored in the memory 120.

The memory 120 according to an embodiment of the disclosure may store various data, a program, or an application for driving and controlling the image processing apparatus 100. The program stored in the memory 120 may include one or more instructions. The program (the one or more instructions) or the application stored in the memory 120 may be executed by the processor 110.

The processor 110 according to an embodiment of the disclosure may include at least one of a central processing unit (CPU), a graphics processing unit (GPU), and a video processing unit (VPU). Alternatively, according to an embodiment of the disclosure, the processor 110 may be implemented as a system-on-chip (SoC) in which at least one of a CPU, a GPU, and a VPU is integrated. Alternatively, the processor 110 may further include a neural processing unit (NPU).

The processor 110 according to an embodiment of the disclosure may generate a second image by processing a first image by using one or more neural networks. For example, the processor 110 may generate the second image by performing denoising to maintain a fine edge and texture while removing noise of the first image, by using the image processing network 103. Alternatively, the processor 110 may generate the second image having a higher resolution than that of the first image, by using the image processing network 103.

The processor 110 according to an embodiment of the disclosure may obtain first feature data of the first image, by using the first feature extraction network 200.

The processor 110 according to an embodiment of the disclosure may obtain pieces of second feature data of the first image, by using the second feature extraction network 300. A structure and an operation of the second feature extraction network 300 of FIG. 2 have been described in detail with reference to FIGS. 3 to 14, and thus, a detailed description thereof will be omitted.

In particular, the processor 110 according to an embodiment of the disclosure may obtain pieces of feature data based on information about peripheral pixels adjacent to each of pixels included in the first image, by using the first self-attention module 412 included in the second feature extraction network 300. A structure and an operation of the first self-attention module 412 have been described in detail with reference to FIGS. 5 and 6, and thus, a detailed description thereof will be omitted.

Also, the processor 110 according to an embodiment of the disclosure may obtain pieces of feature data based on information about peripheral areas (patches) adjacent to each of certain unit areas (patches) included in the first image, by using the second self-attention module 812 included in the second feature extraction network 300. A structure and an operation of the second self-attention module 812 have been described with reference to FIGS. 9 to 11, and thus, a detailed description thereof will be omitted.

Also, the processor 110 according to an embodiment of the disclosure may receive data extracted by the second feature extraction network 300 by using the image reconstruction network 400 and may obtain the second image by using the image reconstruction network 400.

The image processing network 103 according to an embodiment of the disclosure may be a network trained by a server or an external device. The external device may train the image processing network 103, based on training data. In one embodiment, the training data may include a plurality of data sets including image data including noise and image data in which edge characteristics or texture characteristics are preserved while noise is removed.

The server or the external device may determine parameter values included in kernels respectively used in a plurality of convolution layers included in the image processing network 103 and parameter values included in weight matrixes respectively used in linear layers. For example, the server or the external device may determine parameter values to minimize a difference (loss information) between image data generated by the image processing network 103 and image data in which edge characteristics are preserved while noise is removed.

The image processing apparatus 100 according to an embodiment of the disclosure may receive the image processing network 103 whose training is completed from the server or the external device, and may store the image processing network 103 in the memory 120. For example, the memory 120 may store a structure of the image processing network 103 according to an embodiment of the disclosure and parameter values, and the processor 110 may generate the second image in which noise is removed from the first image according to an embodiment of the disclosure and edge characteristics are preserved by using the parameter values stored in the memory 120.

The display apparatus 130 according to an embodiment of the disclosure generates a driving signal by converting an image signal, a data signal, an OSD signal, and a control signal processed by the processor 110. The display apparatus 130 may be implemented as a plasma display panel (PDP), a liquid crystal display (LCD), an organic light-emitting diode (OLED), or a flexible display, or may be implemented as a three-dimensional (3D) display. Also, the display apparatus 130 may include a touchscreen and may use the touchscreen as an output device and an input device.

The display apparatus 130 according to an embodiment of the disclosure may display the second image on which image processing is performed, by using the image processing network 103.

The block diagram of the image processing apparatus 100 of FIG. 15 is a block diagram for an embodiment of the disclosure. Components of the block diagram may be integrated, added, or omitted according to specifications of the image processing apparatus 100 that is actually implemented. That is, when necessary, two or more components may be combined into one component, or one component may be divided into two or more components. Also, a function performed in each block is intended to describe embodiments of the disclosure, and its detailed operations or devices do not limit the scope of the disclosure.

An image processing apparatus according to an embodiment of the disclosure may process an image by using one or more neural networks.

The image processing apparatus according to an embodiment of the disclosure may include a memory storing one or more instructions and at least one processor configured to execute the one or more instructions.

The at least one processor may be configured to execute the one or more instructions to obtain first feature data based on a first image.

The at least one processor may be configured to execute the one or more instructions to obtain pieces of second feature data corresponding to first areas including a first number of pixels, by performing first image processing on the first feature data.

The at least one processor may be configured to execute the one or more instructions to obtain third feature data based on the first image.

The at least one processor may be configured to execute the one or more instructions to obtain pieces of fourth feature data corresponding to second areas including a second number of pixels greater than the first number, by performing second image processing on the third feature data.

The at least one processor may be configured to execute the one or more instructions to generate a second image, based on the pieces of second feature data and the pieces of fourth feature data.

Each of the first image processing and the second image processing may include self-attention.

The at least one processor may be further configured to execute the one or more instructions to obtain the pieces of second feature data respectively corresponding to the first areas, based on information about peripheral areas of each of the first areas.

The at least one processor may be further configured to execute the one or more instructions to obtain the pieces of fourth feature data respectively corresponding to the second areas, based on information about peripheral areas of each of the second areas.

The first number may be 1, and each of the first areas may include one pixel.

The image processing apparatus according to an embodiment of the disclosure may generate the second image, by processing the first image, based on information about peripheral pixels adjacent to each of pixels included in the first image and information about peripheral areas adjacent to each of certain unit areas included in the first image. Accordingly, performance of image processing according to an embodiment of the disclosure may be better than that of existing image processing technologies. For example, the degree of improvement in image quality or the degree of noise removal of the generated second image may be higher than that of an image processed by existing image processing technologies.

The at least one processor may be further configured to execute the one or more instructions to obtain pieces of query data, pieces of key data, and pieces of value data respectively corresponding to the first areas included in the first feature data.

The at least one processor may be further configured to execute the one or more instructions to obtain a weight matrix, based on the pieces of query data and the pieces of key data.

The at least one processor may be further configured to execute the one or more instructions to obtain the pieces of second feature data, based on the pieces of value data and the weight matrix.

The at least one processor may be further configured to execute the one or more instructions stored in the memory 120 to obtain a correlation matrix, based on the pieces of query data and the pieces of key data.

The at least one processor may be further configured to execute the one or more instructions to obtain the weight matrix, by applying, to the correlation matrix, a position bias based on a size of the first image and sizes of images used to train the one or more neural networks.

The at least one processor may be further configured to execute the one or more instructions to transform (e.g., divide) the third feature data (, which is divided into third areas including the first number of pixels) to be divided into the second areas.

The at least one processor may be further configured to execute the one or more instructions to obtain the pieces of fourth feature data, by performing the second image processing on each of the second areas.

The at least one processor may be further configured to execute the one or more instructions to obtain pieces of first query data, pieces of first key data, and pieces of first value data respectively corresponding to third areas including the first number of pixels included in the third feature data.

The at least one processor may be further configured to execute the one or more instructions to obtain pieces of second query data, pieces of second key data, and pieces of second value data corresponding to the second areas, by grouping the pieces of first query data, the pieces of first key data, and the pieces of first value data to respectively correspond to the second areas.

That at least one processor may be further configured to execute the one or more instructions to obtain a weight matrix, based on the pieces of second query data and the pieces of second key data.

The at least one processor may be further configured to execute the one or more instructions to obtain the pieces of fourth feature data, based on the pieces of second value data and the weight matrix.

The third feature data according to an embodiment of the disclosure may be obtained from the pieces of second feature data.

The one or more neural networks according to an embodiment of the disclosure may include one or more convolutional neural networks.

The at least one processor may be further configured to execute the one or more instructions to extract the first feature data from the first image, by using the one or more convolutional neural networks.

The at least one processor may be further configured to execute the one or more instructions to obtain fifth feature data, based on the pieces of second feature data and the pieces of fourth feature data.

The at least one processor may be further configured to execute the one or more instructions to obtain the second image from the fifth feature data, by using the one or more convolutional neural networks.

An operating method of an image processing apparatus for processing an image by using one or more neural networks according to an embodiment of the disclosure may include obtaining first feature data based on a first image.

The operating method of the image processing apparatus for processing an image by using the one or more neural networks according to an embodiment of the disclosure may include obtaining pieces of second feature data corresponding to first areas including a first number of pixels, by performing first image processing on the first feature data.

The operating method of the image processing apparatus for processing an image by using the one or more neural networks according to an embodiment of the disclosure may include obtaining third feature data based on the first image.

The operating method of the image processing apparatus for processing an image by using the one or more neural networks according to an embodiment of the disclosure may include obtaining pieces of fourth feature data corresponding to second areas including a second number of pixels greater than the first number, by performing second image processing on the third feature data.

The operating method of the image processing apparatus for processing an image by using the one or more neural networks according to an embodiment of the disclosure may include generating a second image, based on the pieces of second feature data and the pieces of fourth feature data.

Each of the first image processing and the second image processing according to an embodiment of the disclosure may include self-attention.

The obtaining of the pieces of second feature data may include obtaining the pieces of second feature data respectively corresponding to the first areas, based on information about peripheral areas of each of the first areas.

The obtaining of the pieces of fourth feature data may include obtaining the pieces of fourth feature data respectively corresponding to the second areas, based on information about peripheral areas of each of the second areas.

The first number may be 1, and each of the first areas may include one pixel.

The obtaining of the pieces of second feature data may include obtaining pieces of query data, pieces of key data, and pieces of value data respectively corresponding to the first areas included in the first feature data.

The obtaining of the pieces of second feature data may include obtaining a weight matrix, based on the pieces of query data and the pieces of key data.

The obtaining of the pieces of second feature data may include obtaining the pieces of second feature data, based on the pieces of value data and the weight matrix.

The obtaining of the weight matrix based on the pieces of query data and the pieces of key data may include obtaining a correlation matrix based on the pieces of query data and the pieces of key data, and obtaining the weight matrix by applying, to the correlation matrix, a position bias based on a size of the first image and sizes of images used to train the one or more neural networks.

The obtaining of the pieces of fourth feature data may include transforming the third feature data divided into third areas including the first number of pixels to be divided into the second areas.

The obtaining of the pieces of fourth feature data may include obtaining the pieces of fourth feature data, by performing the second image processing on each of the second areas.

The obtaining of the pieces of fourth feature data may include obtaining pieces of first query data, pieces of first key data, and pieces of first value data respectively corresponding to third areas including the first number of pixels included in the third feature data.

The obtaining of the pieces of fourth feature data may include pieces of second query data, pieces of second key data, and pieces of second value data corresponding to the second areas, by grouping the pieces of first query data, the pieces of first key data, and the pieces of first value data to respectively correspond to the second areas.

The obtaining of the pieces of fourth feature data may include obtaining a weight matrix, based on the pieces of second query data and the pieces of second key data.

The obtaining of the pieces of fourth feature data may include obtaining the pieces of fourth feature data, based on the pieces of second value data and the weight matrix.

The third feature data may be obtained from the pieces of second feature data.

The one or more neural networks may include one or more convolutional neural networks.

The obtaining of the first feature data may include extracting the first feature data from the first image, by using the one or more convolutional neural networks.

The generating of the second image may include obtaining fifth feature data, based on the pieces of second feature data and the pieces of fourth feature data.

The generating of the second image may include obtaining the second image from the fifth feature data, by using the one or more convolutional neural networks.

An operating method of an image processing apparatus according to an embodiment of the disclosure may be implemented as program commands executable through various computer means and may be recorded on a computer-readable medium. The computer-readable medium may include program commands, data files, data structures, and the like separately or in combinations. The program commands recorded on the computer-readable medium may be specially designed and configured for the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a ROM, a random-access memory (RAM), or a flash memory. Examples of the program commands include advanced language code that may be executed by a computer by using an interpreter or the like as well as machine language code made by a compiler.

Also, an image processing apparatus and an operating method of an image processing apparatus according to embodiments of the disclosure may be provided in a computer program product. The computer program product is a product purchasable between a seller and a purchaser.

The computer program product may include an S/W program and a computer-readable storage medium in which the S/W program is stored. For example, the computer program product may include a S/W program-type product (e.g., a downloadable application) electronically distributed through a manufacturer of an electronic device or an electronic market (e.g., Google Play™ store or App Store). For electronic distribution, at least a portion of the S/W program may be stored in a storage medium or temporarily generated. In an embodiment, the storage medium may be a storage medium of a server of the manufacturer, a server of the electronic market, or a relay server that temporarily stores the S/W program.

The computer program product may include a storage medium of a server or a storage medium of a client device in a system including the server and the client device. Alternatively, when there is a third device (e.g., a smartphone) communicating with the server or the client device, the computer program product may include a storage medium of the third device. Alternatively, the computer program product may include a software program itself transmitted from the server to the client device or the third device or from the third device to the client device.

In an embodiment, one of the server, the client device, and the third device may execute a method according to embodiments of the disclosure by executing the computer program product. Alternatively, at least two of the server, the client device, and the third device may execute a method according to embodiments of the disclosure in a distributed fashion by executing the computer program product.

For example, the server (e.g., a cloud server or an artificial intelligence (AI) server) may execute the computer program product stored in the server, and may control the client device communicating with the server to perform a method according to embodiments of the disclosure.

Although embodiments of the disclosure have been described in detail above, the scope of the disclosure is not limited thereto, and various modifications and improvements made by one of ordinary skill in the art by using the basic concept of the disclosure defined by the claims are also within the scope of the disclosure.

What is claimed is:

1. An image processing apparatus for processing an image by using at least one neural network, the image processing apparatus comprising:
  a memory storing at least one instruction; and
  at least one processor configured to execute the at least one instruction to:
    obtain first feature data, based on a first image,
    divide the first feature data into a plurality of first patches, each of the plurality of first patches comprising M pixels,
    obtain pieces of second feature data corresponding to each of pixels included in each of the plurality of first patches by performing a first self-attention operation on the pixels included in the same patch for each of the plurality of first patches,
    obtain third feature data, based on the first image,
    divide the pieces of second feature data into a plurality of second patches, each of the plurality of second patches comprising M pixels,
    obtain pieces of fourth feature data corresponding to each of the plurality of second patches, by performing a second self-attention operation on the plurality of second patches, and
    generate a second image, based on the pieces of second feature data and the pieces of fourth feature data.

2. The image processing apparatus of claim 1, wherein the at least one processor is further configured to execute the at least one instruction to:
  obtain the pieces of second feature data respectively corresponding to the plurality of first patches, based on information about peripheral areas of each of the plurality of first patches, and
  obtain the pieces of fourth feature data respectively corresponding to the plurality of second patches, based on information about peripheral areas of each of the plurality of second patches.

3. The image processing apparatus of claim 1, wherein each of the plurality of first patches comprises one pixel.

4. The image processing apparatus of claim 1, wherein the at least one processor is further configured to execute the at least one instruction to:
  obtain pieces of query data, pieces of key data, and pieces of value data based on the first feature data, the pieces of query data, the pieces of key data, and the pieces of value data respectively corresponding to the plurality of first patches,
  obtain a weight matrix, based on the pieces of query data and the pieces of key data, and obtain the pieces of second feature data, based on the pieces of value data and the weight matrix.

5. The image processing apparatus of claim 4, wherein the at least one processor is further configured to execute the at least one instruction to:
  obtain a correlation matrix, based on the pieces of query data and the pieces of key data, and obtain the weight matrix by applying, to the correlation matrix, a position bias based on a size of the first image and sizes of images used to train the at least one neural network.

6. The image processing apparatus of claim 1, wherein the at least one processor is further configured to execute the at least one instruction to:
  transform the third feature data divided into third areas comprising a first number of pixels to be divided into the plurality of second patches, and obtain the pieces of fourth feature data by performing the second image processing on each of the plurality of second patches.

7. The image processing apparatus of claim 1, wherein the at least one processor is further configured to execute the at least one instruction to:
  obtain pieces of first query data, pieces of first key data, and pieces of first value data based on the third feature data, the pieces of first query data, the pieces of first key data, and the pieces of first value data respectively corresponding to third areas comprising a first number of pixels,
  obtain pieces of second query data, pieces of second key data, and pieces of second value data corresponding to the plurality of second patches, by grouping the pieces of first query data, the pieces of first key data, and the pieces of first value data to respectively correspond to the plurality of second patches, obtain a weight matrix, based on the pieces of second query data and the pieces of second key data, and obtain the pieces of fourth feature data, based on the pieces of second value data and the weight matrix.

8. The image processing apparatus of claim 1, wherein the third feature data is obtained from the pieces of second feature data.

9. The image processing apparatus of claim 1, wherein the at least one neural network comprises at least one convolutional neural network, and wherein the at least one processor is further configured to execute the at least one instruction to extract the first feature data from the first image by using the at least one convolutional neural network.

10. The image processing apparatus of claim 1, wherein the at least one neural network comprises at least one convolutional neural network, and wherein the at least one processor is further configured to execute the at least one instruction to:

obtain fifth feature data, based on the pieces of second feature data and the pieces of fourth feature data, and obtain the second image from the fifth feature data, by using the at least one convolutional neural network.

11. An operating method of an image processing apparatus for processing an image by using at least one neural network, the operating method comprising:

obtaining first feature data, based on a first image;

dividing the first feature data into a plurality of first patches, each of the plurality of first patches comprising M pixels;

obtaining pieces of second feature data corresponding to each of pixels included in each of the plurality of first patches, by performing a first self-attention operation on the pixels included in the same patch for each of the plurality of first patches;

obtaining third feature data, based on the first image;

dividing the pieces of second feature data into a plurality of second patches, each of the plurality of second patches comprising M pixels;

obtaining pieces of fourth feature data corresponding to each of the plurality of second patches by performing a second self-attention operation on the plurality of second patches; and generating a second image, based on the pieces of second feature data and the pieces of fourth feature data.

12. The operating method of claim 11, wherein the obtaining the pieces of second feature data comprises obtaining the pieces of second feature data respectively corresponding to the plurality of first patches, based on information about peripheral areas of each of the plurality of first patches, and wherein the obtaining the pieces of fourth feature data comprises obtaining the pieces of fourth feature data respectively corresponding to the plurality of second patches, based on information about peripheral areas of each of the plurality of second patches.

13. The operating method of claim 11, wherein each of the plurality of first patches comprises one pixel.

14. The operating method of claim 11, wherein the obtaining of the pieces of second feature data comprises:

obtaining pieces of query data, pieces of key data, and pieces of value data based on the first feature data, the pieces of query data, the pieces of key data, and the pieces of value data respectively corresponding to the plurality of first patches;

obtaining a weight matrix, based on the pieces of query data and the pieces of key data; and obtaining the pieces of second feature data, based on the pieces of value data and the weight matrix.

15. The operating method of claim 14, wherein the obtaining the weight matrix comprises:

obtaining a correlation matrix, based on the pieces of query data and the pieces of key data, and obtaining the weight matrix by applying, to the correlation matrix, a position bias based on a size of the first image and sizes of images used to train the at least one neural network.

16. The operating method of claim 11, wherein the obtaining the pieces of fourth feature data comprises:

transforming the third feature data divided into third areas comprising a first number of pixels to be divided into the plurality of second patches; and obtaining the pieces of fourth feature data by performing the second image processing on each of the plurality of second patches.

17. The operating method of claim 11, wherein the obtaining the pieces of fourth feature data comprises:

obtaining pieces of first query data, pieces of first key data, and pieces of first value data based on the third feature data, the pieces of first query data, the pieces of first key data, and the pieces of first value data respectively corresponding to third areas comprising a first number of pixels;

obtaining pieces of second query data, pieces of second key data, and pieces of second value data corresponding to the plurality of second patches, by grouping the pieces of first query data, the pieces of first key data, and the pieces of first value data to respectively correspond to the plurality of second patches;

obtaining a weight matrix, based on the pieces of second query data and the pieces of second key data; and obtaining the pieces of fourth feature data, based on the pieces of second value data and the weight matrix.

18. At least one non-transitory computer-readable recording medium storing a program for executing that is executed by a processor to perform the operating method of claim 11.

* * * * *